(12) United States Patent
Isobe

(10) Patent No.: US 8,811,419 B2
(45) Date of Patent: Aug. 19, 2014

(54) COMMUNICATION DEVICE

(75) Inventor: Takashi Isobe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/820,029

(22) PCT Filed: Mar. 1, 2012

(86) PCT No.: PCT/JP2012/055260
§ 371 (c)(1),
(2), (4) Date: Feb. 28, 2013

(87) PCT Pub. No.: WO2013/014963
PCT Pub. Date: Jan. 31, 2013

(65) Prior Publication Data
US 2014/0140352 A1    May 22, 2014

(30) Foreign Application Priority Data
Jul. 26, 2011    (JP) .................................. 2011-163020

(51) Int. Cl.
*H04L 12/28* (2006.01)

(52) U.S. Cl.
USPC ........................................................ 370/413

(58) Field of Classification Search
CPC ....... H04L 47/10; H04L 47/193; H04L 47/27; H04L 49/90; H04L 49/254; H04L 49/3018; H04L 49/101; H04L 69/10; H04L 69/163
See application file for complete search history.

(56) References Cited

U.S. PATENT DOCUMENTS

| | | | |
|---|---|---|---|
| 6,208,653 | B1 | 3/2001 | Ogawa et al. |
| 7,277,963 | B2 * | 10/2007 | Dolson et al. ................. 709/246 |
| 7,616,644 | B2 * | 11/2009 | Chaskar et al. .......... 370/395.52 |
| 2003/0123481 | A1 * | 7/2003 | Neale et al. .................... 370/466 |
| 2007/0239889 | A1 * | 10/2007 | Mochida et al. .............. 709/237 |
| 2010/0054123 | A1 * | 3/2010 | Yong ............................. 370/230 |
| 2012/0189006 | A1 | 7/2012 | Isobe |

FOREIGN PATENT DOCUMENTS

| | | |
|---|---|---|
| JP | 10-262054 A | 9/1998 |
| JP | 2004-520725 A | 7/2004 |
| JP | 2005-348107 A | 12/2005 |
| JP | 2009-105801 A | 5/2009 |
| JP | 2011-035608 A | 2/2011 |
| WO | 00/46669 A1 | 8/2000 |
| WO | 2012/066824 A1 | 5/2012 |

* cited by examiner

*Primary Examiner* — Yong Zhou
(74) *Attorney, Agent, or Firm* — Mattingly & Malur, PC

(57) ABSTRACT

A relay device relays between two TCP communication items of a LAN side and a WAN side. When a line bandwidth of the WAN side is smaller than a line bandwidth of the LAN side, buffer overflow in a LAN side reception buffer and a WAN side transmission buffer of the relay device is prevented, and a connection is prevented from being forced to be canceled. A value of a reception window size (rwnd) described in an ACK packet returned to a transmission terminal of the LAN side is controlled based on a transmission throughput, a discarding rate, and an RTT measured in TCP communication of the WAN side, and a total size of unarranged data and a size of arranged data in a reception buffer of the LAN side and a size of untransmitted data and ACK awaiting data in a transmission buffer of the WAN side.

14 Claims, 23 Drawing Sheets

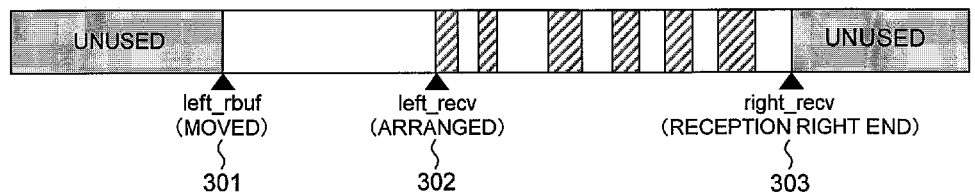
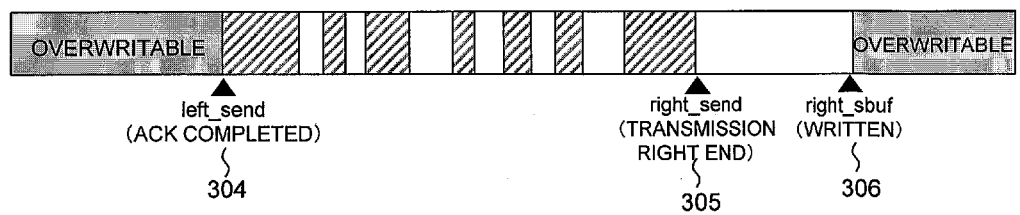
FIG.3

BANDWIDTH TABLE 213

| CONNECTION | BEFORE OLD REFERENCE TIME POINT | | BEFORE REFERENCE TIME POINT | | | REFERENCE TIME POINT | AFTER REFERENCE TIME POINT | | |
|---|---|---|---|---|---|---|---|---|---|
| | TRANS-MISSION BAND-WIDTH | CONTROL BAND-WIDTH | TRANS-MISSION BAND-WIDTH | RETRANS-MISSION BAND-WIDTH | CONTROL BAND-WIDTH | | TRANS-MISSION BIT INTE-GRATED VALUE | RETRANS-MISSION BIT INTE-GRATED VALUE | CONTROL BAND-WIDTH |
| 1 | 180 | 180 | 200 | 20 | 180 | 160 | 7608 | 0 | 190 |
| ⋮ | ⋮ | ⋮ | ⋮ | ⋮ | ⋮ | ⋮ | ⋮ | ⋮ | ⋮ |
| n | 200 | 200 | 220 | 0 | 220 | 220 | 11080 | 512 | 210 |

FIG.8

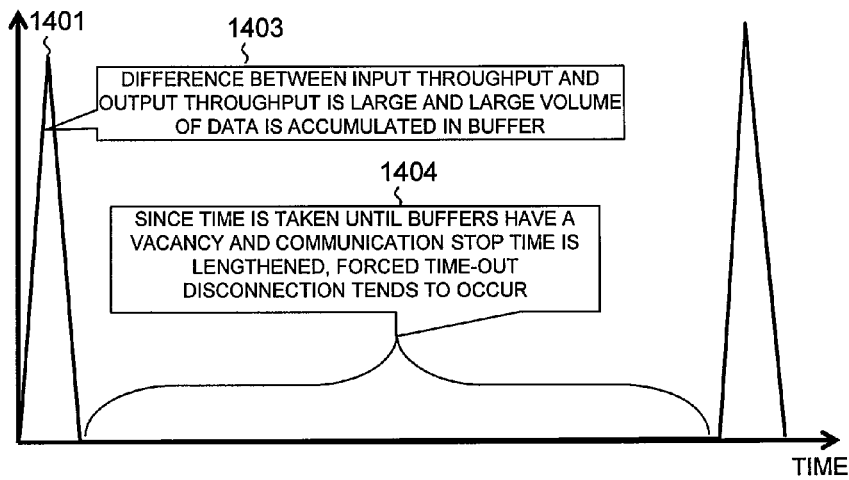
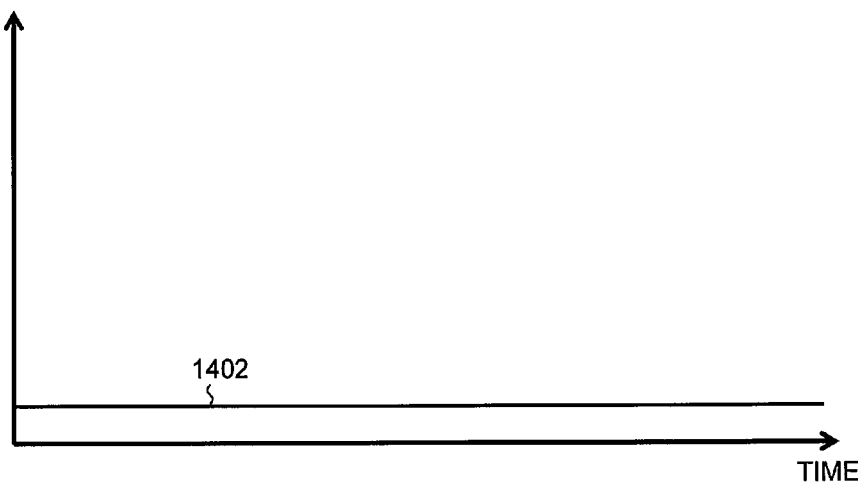
FIG.14

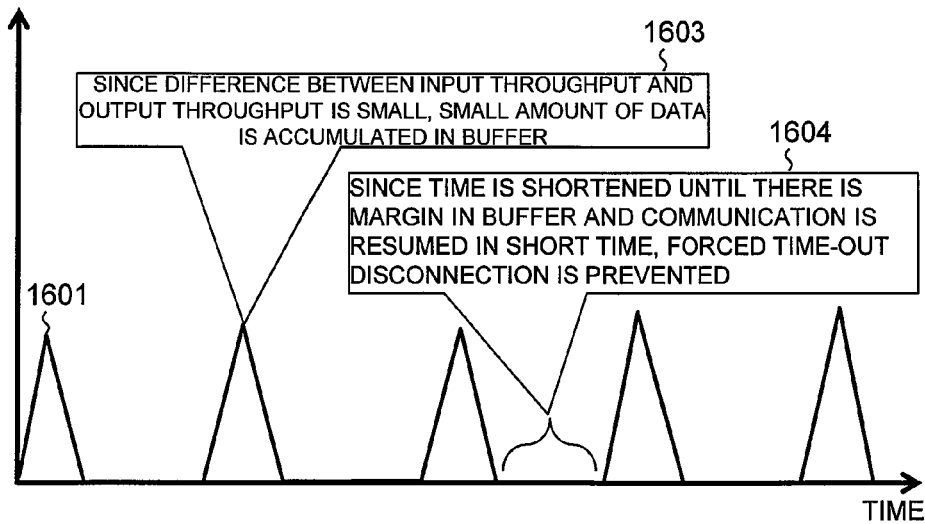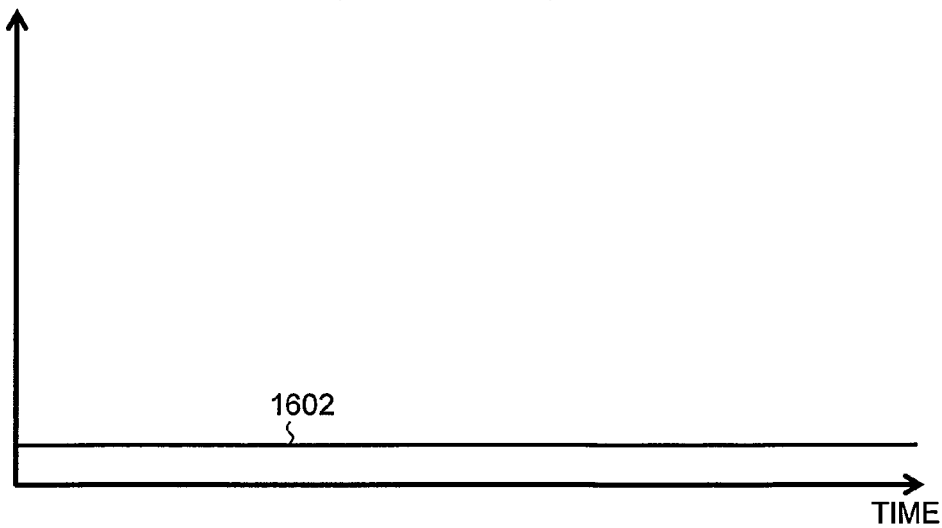
FIG.16

COMMUNICATION DEVICE

TECHNICAL FIELD

The present invention relates to a communication device, and, particularly to a communication device which relays communication between terminals.

BACKGROUND ART

A Wide Area Network (WAN) which employs an Internet Protocol-Virtual Private Network (IP-VPN) technique or the like is generally used as a communication network between bases, used for cloud computing or the like.

In a case where a terminal present in a certain base communicates with a terminal present in another base, the communication is performed via a line which connects a self-base Local Area Network (LAN) to a WAN and a line which connects the WAN to another base LAN. In these lines, an available bandwidth is restricted depending on contract bandwidths.

In communication between terminals, a Transport Communication Protocol (TCP) is generally used. In the TCP communication, data is transferred via a transmission buffer of a transmission terminal and a reception buffer of a reception terminal. An application which operates in the transmission terminal writes data to be transmitted in the transmission buffer. The transmission terminal carries the data written in the transmission buffer in a packet which is transmitted to the reception terminal. When the packet is received from the transmission terminal, the reception terminal accumulates the received data in the reception buffer. In addition, an ACK packet in which a sequence number indicating an end of the received data which has been arranged and a remaining capacity of the reception buffer are described is returned to the transmission terminal. When the ACK packet is received, the transmission terminal determines the received data from the described sequence number and deletes the data from the transmission buffer. An application which operates in the reception terminal periodically reads the received data which has been arranged and accumulated in the reception buffer, and deletes the read data from the reception buffer. Each terminal has a set of the transmission buffer and the reception buffer for a single TCP communication item, and writes data in the transmission buffer in a case of transmission and reads data from the reception buffer in a case of reception.

PTL 1 discloses a method of controlling the size of data accumulated in a transmission buffer or the size of data which can be newly accumulated, based on a value of a congestion window size.

PTL 2 discloses a method of controlling a data size of a buffer based on a multiplication value of a bandwidth and communication delay.

CITATION LIST

Patent Literature

[PTL 1] JP-A-2005-348107
[PTL 2] JP-T-2004-520725

SUMMARY OF INVENTION

Technical Problem

In a relay device which relays between two TCP communication items of a LAN side and a WAN side, when a line bandwidth of the LAN side is larger than a line bandwidth of the WAN side, there are cases where an input throughput to the relay device from a transmission terminal of the LAN side becomes larger than an output throughput to the WAN from the relay device, and thereby a large volume of data may be accumulated in a buffer of the relay device and may overflow. If the buffer overflow occurs, a transmission terminal of the LAN side is notified that a buffer remaining capacity is 0, and thus transmission from the transmission terminal of the LAN side to the relay device stops.

When the output throughput to the WAN from the relay device is relatively smaller than the input throughput to the relay device from the transmission terminal of the LAN side, time is taken until data accumulated in the buffer of the relay device decreases and then the buffer has a vacancy. There is a problem in that the communication stop time is lengthened since a long time is taken until the buffer of the relay device has a vacancy and communication is resumed, and the transmission terminal of the LAN side is not immediately notified that the buffer has a vacancy in the TCP. In addition, there is a problem in that the transmission terminal mistakes the communication as being disconnected due to the long communication stop time, and thereby connection is forced to be canceled.

The present invention has been made in light of these problems, and an object thereof is to provide a communication device which relays TCP communication via a first network side and a second network side, prevents transmission and reception buffers of the communication device from overflowing and prevents a connection of the terminal from being forced to be canceled in a case where a line bandwidth of the second network side is smaller than a line bandwidth of the first network side.

Solution to Problem

In order to solve at least one of the above-described problems, according to the first solving means of the present invention, there is provided a communication device which relays TCP communication of a first network and a second network, comprising:

a buffer that temporarily accumulates relay data which is received from the first network and is relayed to the second network;

a reception unit that calculates a size of the relay data accumulated in the buffer; and a transmission bandwidth control unit that measures a practical transmission throughput to the second network, wherein the reception unit calculates a value of a reception window size which is described in an ACK packet transmitted in the TCP communication of the first network side on the basis of the size of the relay data and the transmission throughput.

For example, as a detailed aspect of the first solving means, there are provided means for calculating a total value of sizes of data accumulated in a device based on a size of unarranged data and a size of arranged data accumulated in a reception buffer for a LAN side TCP communication, and a size of untransmitted data and a size of acknowledgement awaiting data accumulated in a transmission buffer for WAN side TCP communication; means for measuring a transmission throughput and a retransmission throughput of the WAN side TCP communication; and means for calculating a value of a reception window size (rwnd) which is described in an ACK packet returned to a transmission terminal of the LAN side based on the total value of the accumulated data sizes, and the transmission throughput, the retransmission throughput, and a round trip time (RTT) of the WAN side TCP communication. Further, there is provided means for immediately transmitting an ACK packet in which a value of rwnd is described to the transmission terminal of the LAN side when rwnd decreases so as to be less than a predefined threshold value and then exceeds the threshold value again.

According to the aspect, when there is a margin in a buffer, communication can be immediately resumed so as to shorten a communication stop time.

Advantageous Effects of Invention

According to the present invention, in a communication device which relays TCP communication via a first network side and a second network side, overflowing of transmission and reception buffers of the communication device for the relay is prevented in a case where a line bandwidth of the second network side is smaller than a line bandwidth of the first network side. Also, it is possible, according to the present invention, to provide a communication device which prevents a connection of the terminal from being forced to be canceled.

BRIEF DESCRIPTION OF DRAWINGS

FIG. 3 is a diagram illustrating a pointer of a buffer.

FIG. 8 is a diagram illustrating a format of a bandwidth table 213.

FIG. 14 is a throughput diagram illustrating problems of a relay device in the related art.

FIG. 16 is a throughput diagram illustrating effects of the present application.

DESCRIPTION OF EMBODIMENTS

The representative embodiment for implementing the present invention is as follows.

First, problems of relay devices 1310 and 1320 in the related art will be described with reference to FIGS. 13 and 14.

Figure 13:
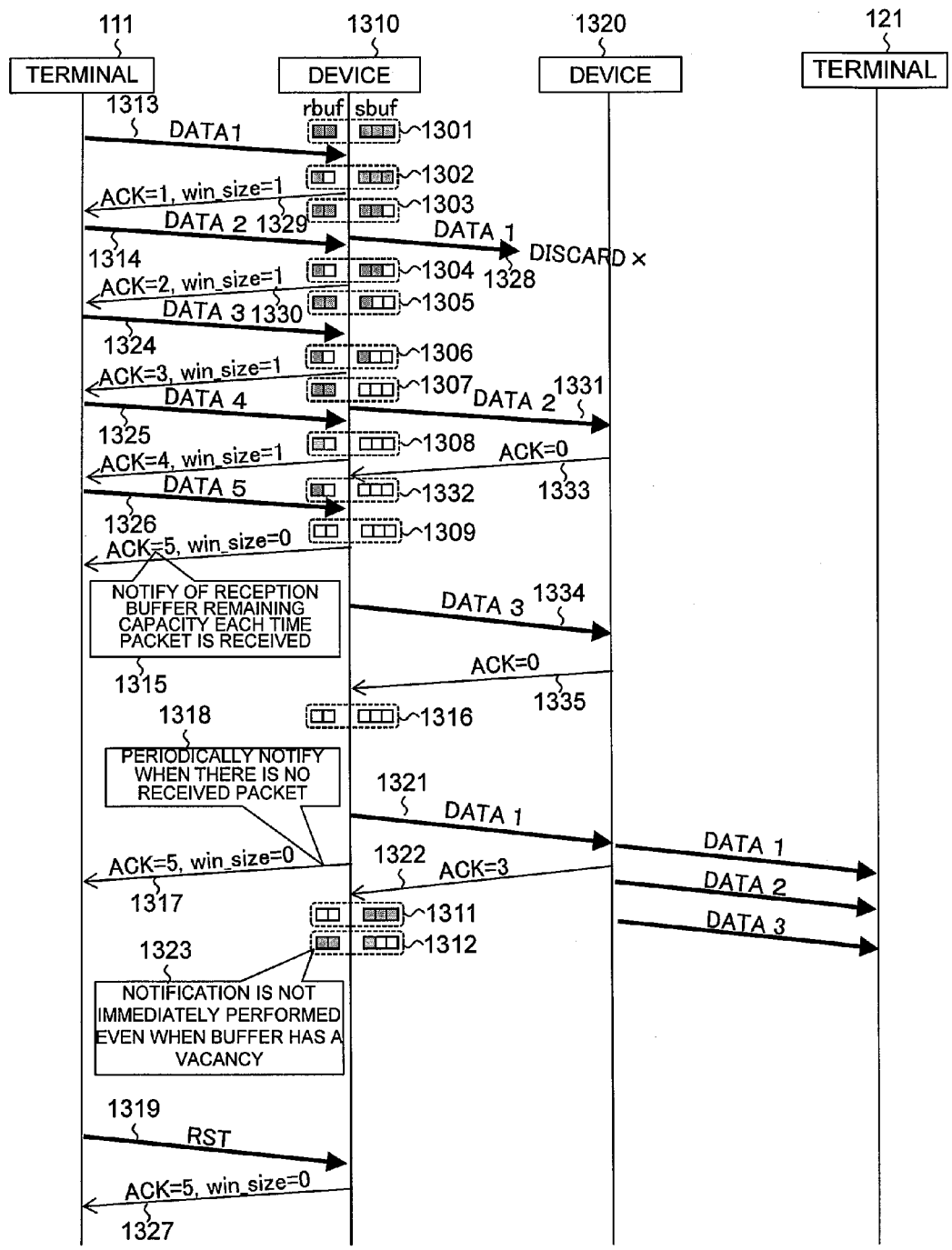
FIG. 13 is a sequence diagram illustrating problems of a relay device in the related art.

FIG. 13 is a sequence diagram when the devices 1310 and 1320 in the related art relay communication between a terminal 111 and a terminal 121. FIG. 14 shows transitions of a LAN bandwidth 1401 between the terminal 111 and the device 1310 and a WAN bandwidth 1402 between the device 1310 and the device 1320.

In this example, the device 1310 includes a reception buffer rbuf which can accumulate two packets on the LAN side and a transmission buffer sbuf which can accumulate three packets on the WAN side (1301).

When a first data packet 1313 is received from the terminal 111, the device 1310 accumulates a single data item described in the packet, in the reception buffer rbuf of the LAN side of the device 1310 (1302). After the first data packet is received, the device 1310 returns an ACK packet (1329) in which ACK=1 indicating that the first data has been received and win_size=1 indicating that a residual size of the reception buffer is 1 are described, to the terminal 111. The first data accumulated in the reception buffer of the LAN side is transferred to the transmission buffer of the WAN side (1303). The first data is transferred to the transmission buffer of the WAN side and is then sent to the device 1320 of the WAN side, but is assumed to be discarded here (1328).

Next, when a second data packet 1314 is received from the terminal 111 of the LAN side, the device 1310 accumulates a single data item described in the packet, in the reception buffer rbuf of the LAN side of the device 1310 (1304). After the second data packet is received, the device 1310 returns an ACK packet (1330) in which ACK=2 indicating that the second data has been received and win_size=1 indicating that a residual size of the reception buffer is 1 are described, to the terminal 111. The second data accumulated in the reception buffer of the LAN side is transferred to the transmission buffer of the WAN side (1305). Since the first data is discarded and a control bandwidth when transmission to the WAN side is performed is still small, the second data is transferred to the transmission buffer of the WAN side, then is not transmitted to the WAN side for the time being, and is accumulated therein.

Next, when a third data packet 1324 is received from the terminal 111 of the LAN side, the device 1310 accumulates a single data item described in the packet, in the reception buffer rbuf of the LAN side of the device 1310 (1306). After the third data packet is received, the device 1310 returns an ACK packet in which ACK=3 indicating that the third data has been received and win_size=1 indicating that a residual size of the reception buffer is 1 are described, to the terminal 111. The third data accumulated in the reception buffer of the LAN side is transferred to the transmission buffer of the WAN side (1307). Since the first data is discarded and the control bandwidth of the WAN side is still small, the third data is transferred to the transmission buffer of the WAN side, then is not transmitted to the WAN side for the time being, and is accumulated therein. The second data which remained accumulated at a previous time is transmitted to the WAN side, for example, here (1331).

Next, when a fourth data packet 1325 is received from the terminal 111 of the LAN side, the device 1310 accumulates a single data item described in the packet, in the reception buffer rbuf of the LAN side of the device 1310 (1308). After the fourth data packet is received, the device 1310 returns an ACK packet in which ACK=4 indicating that the fourth data has been received and win_size=1 indicating that a remaining capacity of the reception buffer is 1 are described, to the terminal 111. The fourth data accumulated in the reception buffer of the LAN side is not transferred since the transmission buffer of the WAN side is full (1332). Since the data item 1 is not transmitted even if ACK for the data item 2 is returned from the device 1320 of the WAN side (1333), the data items 1 to 3 accumulated in the transmission buffer of the WAN side are not deleted and are left (1332).

Next, when a fifth data packet 1326 is transmitted from the terminal 111 of the LAN side, two packets are accumulated in the reception buffer of the LAN side (1309). After the fifth data packet is received, the device 1310 returns an ACK packet in which ACK=5 indicating that the fifth data has been received and win_size=0 indicating that a residual size of the reception buffer is 0 are described, to the terminal 111.

As described above, the device 1310 transmits the ACK packet in which a reception buffer remaining capacity is described to the transmission terminal 111 of the LAN side each time the data packet is received (1315).

The terminal 111 which has received the ACK packet of win_size=0 indicating that there is no reception buffer remaining capacity determines that the reception buffer of the LAN side in the device 1310 is full, and stops transmission of data.

Thereafter, since the data item 1 does not arrive even if the third data is transmitted to the WAN side from the device 1310 (1334) and ACK for the third data is returned (1335), the data items 1 to 3 accumulated in the transmission buffer of the WAN side are not deleted and are left (1316).

When a data packet is not received from the transmission terminal 111 of the LAN side, the device 1310 periodically sends an ACK packet (1317) to the device 111 (1318). In the ACK packet, win_size=0 indicating that a residual size of the reception buffer of the LAN side is 0 is described. As such, when a packet is received (1315), or periodically (1318), the ACK packet is transmitted to the device 111 of the LAN side.

As described above, in a case where a line bandwidth of the WAN side is smaller than a line bandwidth of the LAN side, since an input throughput to the device 1310 from the transmission terminal 111 of the LAN side is larger than an output throughput to the device 1320 of the WAN side from the device 1310 and a difference therebetween is large, a large volume of data is accumulated in the transmission buffer sbuf of the WAN side and the reception buffer rbuf of the LAN side of the device 1310 and thus the buffers immediately become full. Further, since time is taken until the buffers have a vacancy, and a stop time of subsequent data transmission is long, there are cases where the terminal 111 determines that some sort of problem is occurring in the connection and forces to cancel the connection (1401) through transmission of an RST packet (1319).

If an ACK packet for the data item 1 is not returned, the device 1310 retransmits the data item 1 after a while (1321). Then, ACK=3 indicating that the data items 1 to 3 have been received is received from the device 1320 (1322). Thereby, the data items 1 to 3 accumulated in the transmission buffer of the WAN side are deleted (1311). Successively, the fourth and fifth data items accumulated in the reception buffer of the LAN side are transferred to the transmission buffer of the WAN side (1312). Thereby, the reception buffer rbuf of the LAN side becomes vacant.

Since an ACK packet is periodically transmitted when there is no reception packet, an ACK packet in which win_size is described is not immediately transmitted to the terminal 111 (1323) even if the reception buffer of the LAN side is vacant. Therefore, the terminal 111 cannot resume transmission of data, and a stop time of transmission of data is lengthened. Depending on cases, before transmission of periodic ACK packet (1327), the terminal 111 determines that some sort of problem is occurring in the connection and forces to cancel the connection through transmission of an RST packet (1319).

This will be further described with reference to FIG. 14.

As described above, in a case where a line bandwidth of the WAN side is smaller than a line bandwidth of the LAN side, since an input throughput (1401) to the device 1310 from the transmission terminal 111 of the LAN side is larger than an output throughput (1402) to the device 1320 of the WAN side from the device 1310, a large volume of data is accumulated in the transmission buffer sbuf of the WAN side and the reception buffer rbuf of the LAN side of the device 1310 and thus the buffers immediately become full (1403). Further, since time is taken until the buffers have a vacancy, and a stop time of subsequent data transmission is lengthened, there is a problem in that the terminal 111 determines that some sort of problem is occurring in the connection and forces canceling of the connection (1404) through transmission of an RST packet (1319). In addition, since an ACK packet in which win_size is described is not immediately transmitted to the terminal 111 (1323) even if the reception buffer of the LAN side is vacant, the terminal 111 cannot resume transmission of data, and a stop time of transmission of data is lengthened. There is a problem in that, depending on cases, the terminal 111 determines that some sort of problem is occurring in the connection and forces to cancel the connection through transmission of an RST packet (1319).

In addition, as disclosed in PTL 1, in the method of controlling the size of accumulation in the buffer or the size of data which can be newly accumulated based on a congestion window size which is a variable for controlling the TCP communication, an available buffer amount decreases when an RTT of the WAN side increases. For example, in a case where communication is performed using an independent TCP in which a necessary buffer amount increases according to an increase in transmission throughput, RTT, or discarding rate, there is a problem in that a sufficient throughput cannot be achieved. Further, as disclosed in PTL 2, in a method of restricting a reception window size for a client terminal when a communication rate between relay devices is higher than a communication rate between the relay device and the client, the reception window size of communication of a side of which a throughput is smaller is restricted so as to unnecessarily enlarge a communication rate difference, and thereby the problems to be solved by the present application cannot be solved. Furthermore, as disclosed in PTL 2, in a method of restricting a data accumulation amount in a buffer by using bandwidth-delay product, there is a problem in that, reception of a packet exceeding the restriction causes a buffer to overflow and the packet to be discarded, thus a packet is frequently retransmitted, and, on the contrary, resumption of transmission of data is delayed.

The present embodiment solves the problems which cannot be solved by the methods in the related art.

Figure 1:
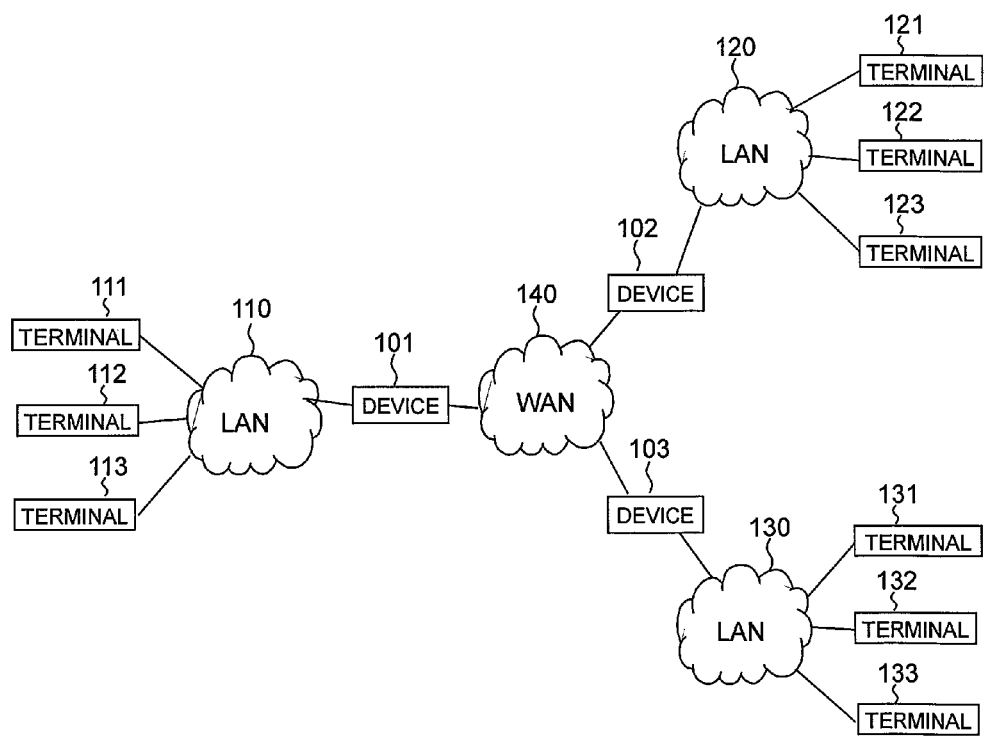
FIG. 1 is a configuration diagram of a system including a device according to the present embodiment.

FIG. 1 is a configuration diagram of a network system which employs a communication device according to the present embodiment.

Communication devices (also referred to as relay devices; hereinafter, simply referred to as devices) 101, 102 and 103 are provided on communication lines which connect LANs (first network) 110, 120 and 130 inside a plurality of bases to a WAN (second network) 140. A plurality of terminals 111 to 113, 121 to 123 and 131 to 133 are connected to the LANs 110, 120 and 130 inside the respective bases. The devices 101, 102 and 103 relay between two TCP communication items of the first network and the second network. In addition, the devices 101, 102 and 103 may relay TCP communication of two WANs. Further, each number of the terminals, the devices, and the networks may be an appropriate number as well as the number shown in the figure.

Figure 2:
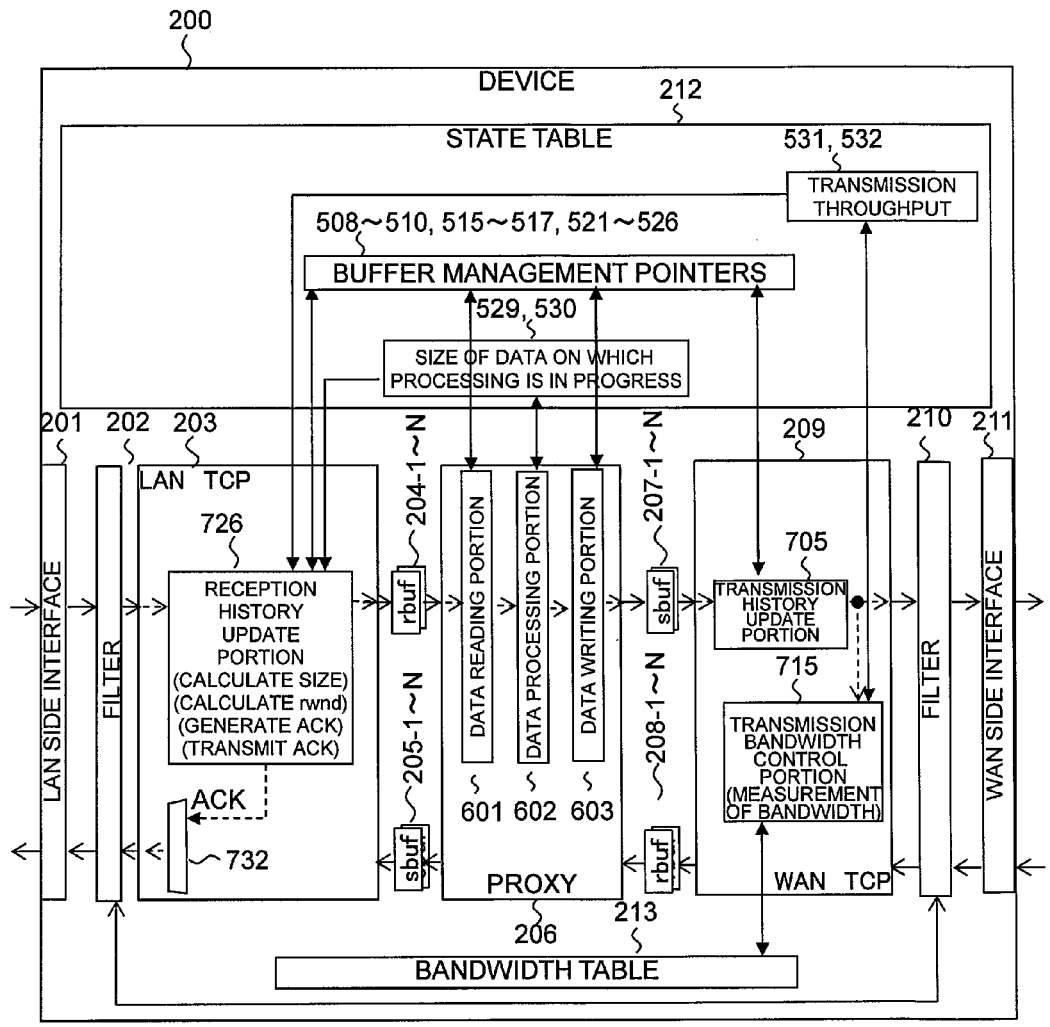
FIG. 2 is a block diagram of a device 200.

FIG. 2 is a block diagram of a device 200 according to the present embodiment.

The device 200 includes, for example, network interfaces (201 and 211) of a WAN side and a LAN side which transmit and receive a packet to and from external WAN/LAN networks, filters (202 and 210) for passing a UDP packet or an ARP packet other than a TCP packet, TCP modules 203 and 209 of the WAN side and the LAN side which perform control for TCP communication, N transmission buffers 207 and N reception buffers 208 managed by the TCP module 209 of the WAN side, N transmission buffers 205 and N reception buffers 204 managed by the TCP module 203 of the LAN side, a proxy (a data transfer unit) 206 which replaces data between the transmission and reception buffers, a state table 212 having N entries, and a bandwidth table 213 having N entries. In addition, the above-described number N may be different.

The TCP modules 203 and 209, the proxy 206, the state table 212, and the bandwidth table 213 will be described in detail later with reference to other drawings, and will be described briefly here.

The TCP module 209 of the WAN side includes a transmission bandwidth control portion 715 and a transmission history update portion 705. The transmission bandwidth control portion 715 accumulates information of transmission throughputs (531 and 532) in the state table 212. The transmission history update portion 705 updates information of buffer management pointers (508 to 510, 515 to 517, and 521 to 526) of the state table 212 according to a transmission data size read from the WAN side transmission buffer 207.

The proxy 206 includes a data reading portion 601, a data processing portion 602, and a data writing portion 603. The data processing portion 602 accumulates information of a size (529 and 530) of data on which processing is in progress in the state table 212. The data reading portion 601 updates information of the buffer management pointers (508 to 510, 515 to 517, and 521 to 526) of the state table 212 according to a data size read from the LAN side reception buffer 204. The data writing portion 603 updates information of the buffer management pointers (508 to 510, 515 to 517, and 521 to 526) of the state table 212 according to a data size written in the WAN side transmission buffer 207.

The TCP module 203 of the LAN side includes a reception history update portion 726 and an aggregation unit 732. The reception history update portion 726 accumulates received packet data in the LAN side reception buffer. In addition, the reception history update portion 726 updates information of the buffer management pointers (508 to 510, 515 to 517, and 521 to 526) of the state table 212 according to the size of accumulated data. Further, the reception history update portion 726 calculates a total value of the size of data accumulated in the LAN side reception buffer, the size of data accumulated in the WAN side transmission buffer, and the size of data on which processing is in progress, from information read from the buffer management pointers (508 to 510, 515 to 517, and 521 to 526) of the state table 212 and the size (529 and 530) of data on which processing is in progress. Furthermore, the reception history update portion 726 calculates a reception window size (rwnd) on the basis of the calculated data size and information of the transmission throughputs (531 and 532) of the state table 212, generates an ACK packet in which a value of the calculated reception window size (rwnd) is described, and transmits the generated ACK packet to the LAN side via the aggregation unit 732.

Figure 4:
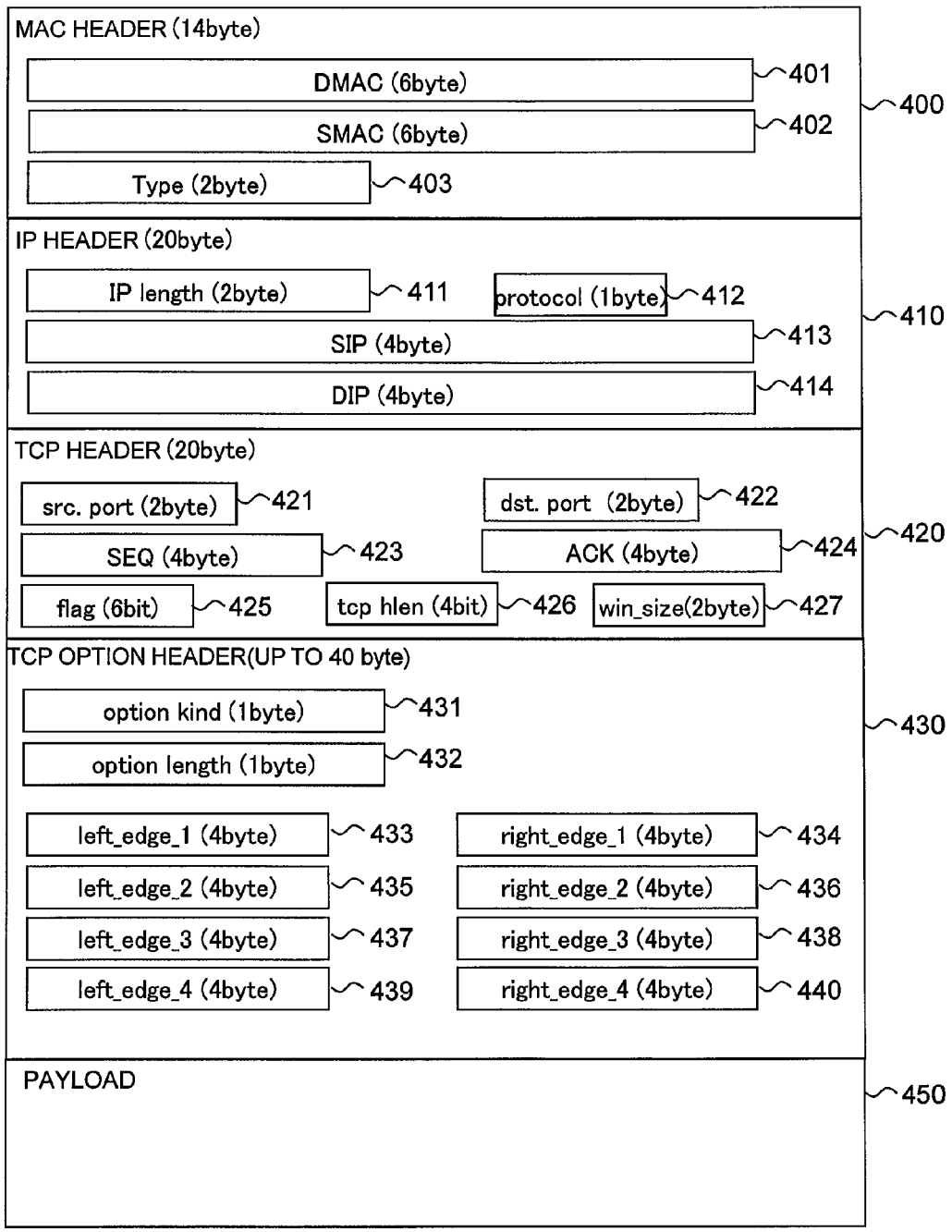
FIG. 4 is a diagram illustrating a format of a packet.

FIG. 4 is a diagram illustrating a format of a packet which is sent and received by the device.

The packet has a MAC header 400, an IP header 410, a TCP header 420, a TCP option header 430, and a payload 450. The MAC header 400 includes DMAC 401 indicating a destination MAC address, SMAC 402 indicating a transmission source MAC address, and Type 403 indicating a MAC frame type. In addition, the IP header 410 includes IP length 411 indicating a packet length excluding the MAC header, protocol 412 indicating a protocol number, SIP 413 indicating a transmission IP address, and DIP 414 indicating a destination IP address. The TCP header 420 includes src.port 421 indicating a transmission source port number, dst.port 422 indicating a destination port number, SEQ 423 indicating a transmission sequence number, ACK 424 indicating a reception sequence number, flag 425 indicating a TCP flag number, tcp hlen 426 indicating a header length of a TCP, and win_size 427 indicating a residual size of the reception buffer. The TCP option header 430 includes option kind 431 indicating the kind of option, option length 432 indicating an option length, and left_edge_1 to 4 (433, 435, 437, and 439) and right_edge_1 to 4 (434, 436, 438, and 440) describing which location can be partially received.

FIG. 3 is a diagram illustrating pointers for managing the transmission and reception buffers. In this figure, it is assumed that data is written from the left to the right, and is read from the left to the right.

The reception buffers (204 and 208) manage a pointer right_recv 303 indicating a head (new data) of received data, a pointer left_recv 302 indicating a boundary between arranged data and unarranged data, and left_rbuf 301 indicating a boundary between data which has been read by the proxy 206 and data which has not been read.

The pointer right_recv 303 indicating a head of received data increases by the size of the received data and moves to the right when data is sequentially received from before without a loss. If a retransmitted packet is received in a state in which there is a location (loss segment) of data which is not received and is omitted, and the loss segment disappears, the pointer left_recv 302 indicating a boundary between arranged data and unarranged data moves to the left end of the smallest loss segment. The proxy 206 sequentially reads data from left_rbuf 301 indicating a boundary between data which has been read and data which has not been read, and moves left_rbuf 301 to the right by the size of the read data. The maximum value of the size of the readable data is a value corresponding to a difference between left_recv 302 and left_rbuf 301.

The transmission buffers (205 and 207) manage a pointer right_sbuf 306 indicating a head of data which can be transmitted in a state of having been written by the proxy 206, a pointer right_send 305 indicating a head of transmitted data (also a boundary between data which has been transmitted and data which has not been transmitted), and a pointer left_send 304 indicating a head of data for which an acknowledgement has been received from a reception side.

The pointer right_sbuf 306 indicating a head of data which can be transmitted in a state of having been written by the proxy 206 increases by the size of written data and moves to the right each time the proxy 206 writes data. When new data is transmitted using the pointer right_send 305 indicating a head of transmitted data as a start point, right_send 305 increases by the size of the transmitted data and moves to the right. When an acknowledgement packet having a sequence number larger than left_send 304 is received from the reception side, left_send 304 increases to the received sequence number described in the acknowledgement packet and moves to the right.

Figure 5:
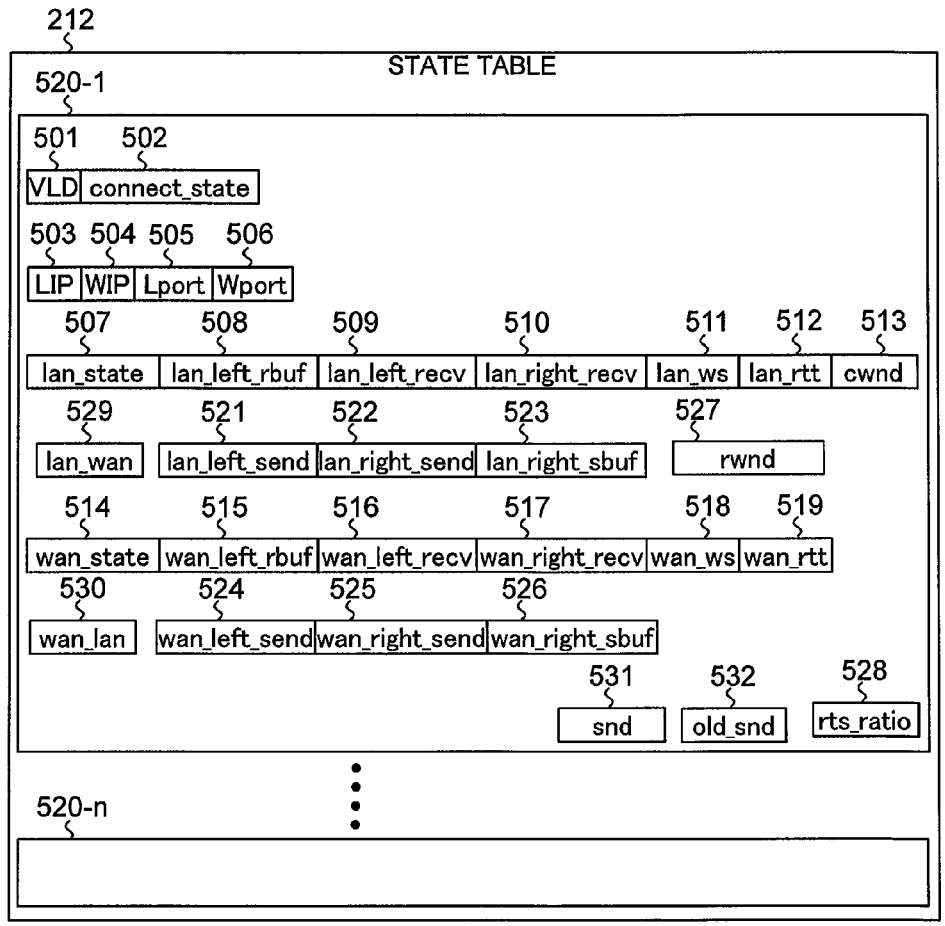
FIG. 5 is a diagram illustrating a format of a state table 212.

FIG. 5 is a diagram illustrating a format of the state table 212.

The state table 212 has n entries 520-1 to 520-n.

Each entry 520 includes VLD 501 describing whether or not an entry is used, connect_state 502 describing whether or not a connection of the LAN side or the WAN side is established, LIP 503 indicating an IP address of a terminal of the LAN side, WIP 504 indicating an IP address of a terminal of the WAN side, Lport 505 indicating a TCP port number of a terminal of the LAN side, Wport 506 indicating a TCP port number of a terminal of the WAN side, lan_state 507 indicating a TCP communication state of the LAN side, lan_left_rbuf 508, lan_left_recv 509, and lan_right_recv 510 indicating pointers for managing the reception buffers of the LAN side, lan_ws 511 indicating a value of a window scale option of the LAN side, lan_rtt 512 indicating an average RTT of the LAN side, cwnd 513 indicating a congestion window size of the LAN side, lan_left_send 521, lan_right_send 522, and lan_right_sbuf 523 indicating pointers for managing the transmission buffers of the LAN side, rwnd 527 indicating a reception window size of which a transmission terminal of the LAN side is notified, lan_wan 529 indicating the size of data which is read from the reception buffer of the LAN side and on which processing is in progress, wan_state 514 indicating a TCP communication state of the WAN side, wan_left_rbuf 515, wan_left_recv 516, and wan_right_recv 517 indicating pointers for managing the reception buffers of the WAN side, wan_ws 518 indicating a value of a window scale option of the WAN side, wan_rtt 519 indicating an average RTT of the WAN side, rts_ratio 528 indicating a retransmission ratio of the WAN side, snd 531 indicating a transmission bandwidth after a reference time point of the WAN side, old_snd 532 indicating a transmission bandwidth before a reference time point of the WAN side, wan_left_send 524, wan_right_send 525, and wan_right_sbuf 526 indicating pointers for managing the transmission buffers of the WAN side, and wan_lan 530 indicating the size of data which is read from the reception buffer of the WAN side and on which processing is in progress.

Figure 6:
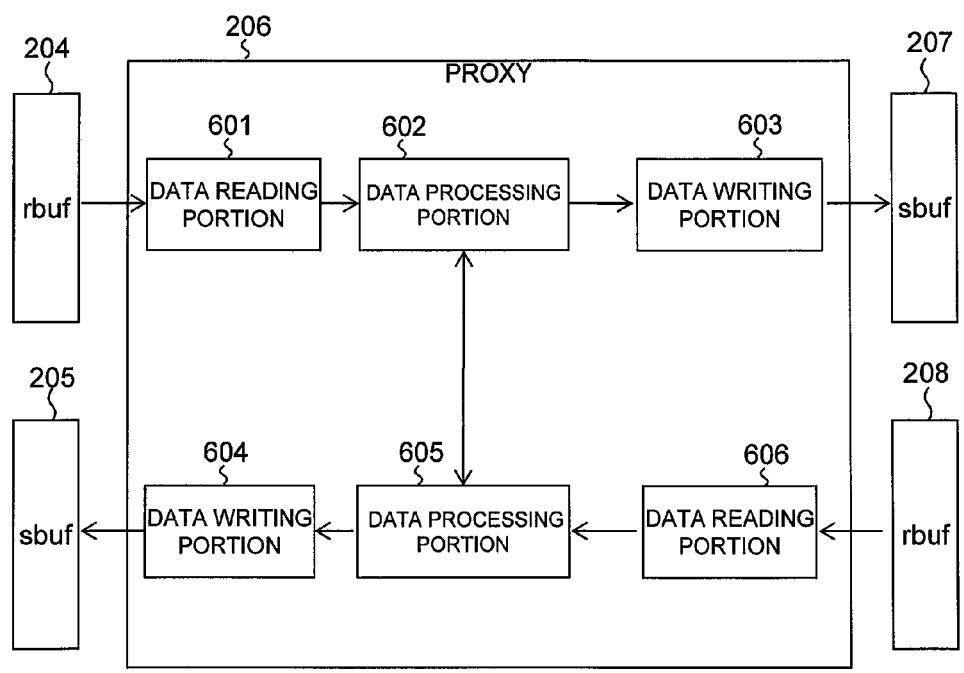
FIG. 6 is a block diagram of a proxy unit 206.

FIG. 6 is a block diagram of the proxy 206.

The proxy 206 includes, for example, the data reading portion 601 which reads data from the reception buffer rbuf 204 of the LAN side, the data processing portion 602 which performs processings such as compression, decompression, encoding, decoding, deletion, copying, and appending, on the read data, the data writing portion 603 which writes the processed data in the transmission buffer sbuf 207 of the WAN side, a data reading portion 606 which reads data from the reception buffer rbuf 208 of the WAN side, a data processing portion 605 which performs processings such as compression, decompression, encoding, decoding, deletion, copying, and appending, on the read data, and a data writing portion 604 which writes the processed data in the transmission buffer sbuf 205 of the LAN side. There are cases where data is exchanged between the data processing portion 602 and the data processing portion 605. A process by the data processing units 602 and 605 may include appropriate processes on data in addition to the above-described example.

The data reading portion 601 estimates the size of data to be read and the data size after data processing, from leading data read from arranged data which is accumulated between lan_left_rbuf 508 and lan_left_recv 509. As the leading data, a Transport Layer Security (TLS)/Secure Socket Layer (SSL) header, a Server Message Block (SMB) header, or the like may be used. From a value described in the TLS/SSL header, a checksum after decoding, or the size of plaintext excluding the header can be estimated. From the SMB header, a command data size after a prefetch or the like is performed can be estimated. In a case where a difference between the estimated size of the processed data, and wan_right_sbuf 526 and wan_left_send 524, that is, a sum of untransmitted data and a total of ACK awaiting data does not exceed the transmission buffer size wan_sbuf_size of the WAN side, data is read from the reception buffer 204 and is transferred to the data processing portion 602. Further, the larger size of the estimated size of data to be read and the data size after data processing is described in lan_wan 529 of the state table 212. Details thereof will be described later with reference to the flowchart diagram shown in FIG. 9.

The data reading portion 606 estimates the size of data to be read and the data size after data processing, from leading data read from arranged data which is accumulated between wan_left_rbuf 515 and wan_left_recv 516. As the leading data, a Transport Layer Security (TLS)/Secure Socket Layer (SSL) header, a Server Message Block (SMB) header, or the like may be used. In a case where a difference between the estimated size of the processed data, and lan_right_sbuf 523 and lan_left_send 521, that is, a sum of untransmitted data and a total of ACK awaiting data does not exceed the transmission buffer size lan_sbuf_size of the LAN side, data is read from the reception buffer 208 and is transferred to the data processing portion 605. Further, the larger size of the estimated size of data to be read and the data size after data processing is described in wan_lan 530 of the state table 212. Details thereof will be described later with reference to the flowchart diagram shown in FIG. 10.

Figure 9:
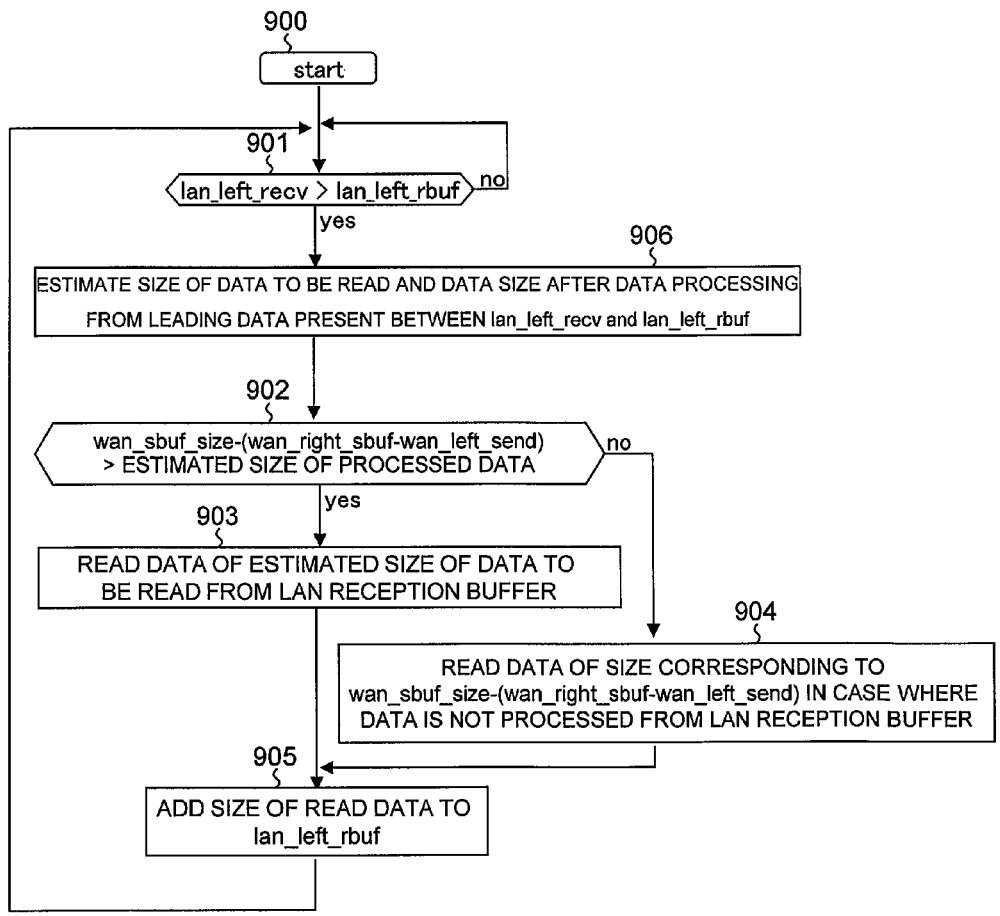
FIG. 9 is a flowchart diagram illustrating a process in which the proxy unit 206 moves data of a LAN side reception buffer to a WAN side transmission buffer.
Figure 10:
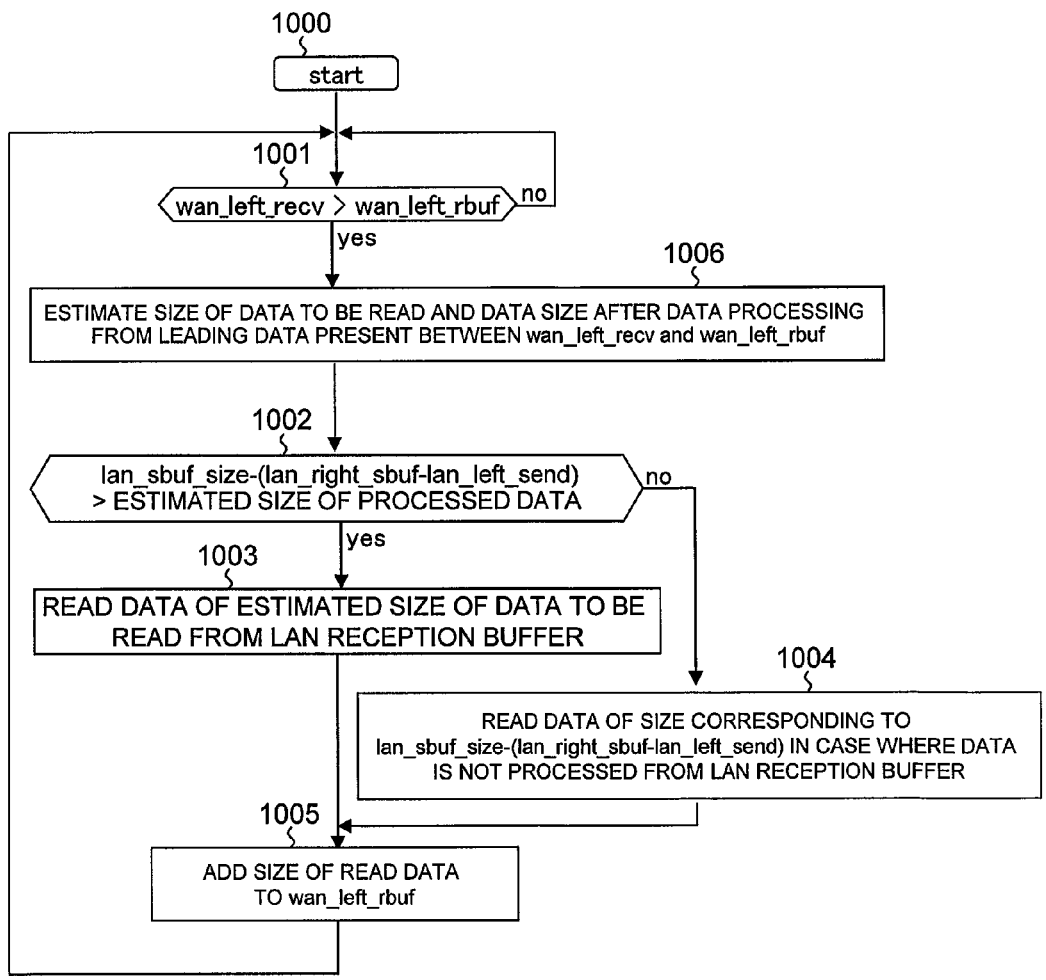
FIG. 10 is a flowchart diagram illustrating a process in which the proxy unit 206 moves data of a WAN side reception buffer to a LAN side transmission buffer.

FIGS. 9 and 10 are respectively flowchart diagrams illustrating data reading processes by the data reading portion 601 and the data reading portion 606.

Each process of FIG. 9 is performed by the data reading portion 601.

When the process starts (step 900), first, the data reading portion 601 compares whether or not lan_left_recv 509 is larger than lan_left_rbuf 508 so as to determine whether or not there is arranged data in the reception buffer of the LAN side (step 901). If it is determined that lan_left_recv 509 is not larger than lan_left_rbuf 508 in step 900, that is, there is no arranged data, step 901 is repeatedly performed. On the other hand, if it is determined that lan_left_recv 509 is larger than lan_left_rbuf 508 in step 900, that is, there is arranged data, then, the size of data to be read and the data size after data processing are estimated from leading data of arranged data present between lan_left_recv 509 and lan_left_rbuf 508 (step 906). As the leading data, a Transport Layer Security (TLS)/Secure Socket Layer (SSL) header, a Server Message Block (SMB) header, or the like may be used. An estimation method may use appropriate methods.

Next, it is compared whether or not a difference (a vacant buffer size) between a difference (a total value of untransmitted data and ACK awaiting data) between wan_right_sbuf 526 and wan_left_send 524, and the transmission buffer size wan_sbuf_size of the WAN side is larger than the size of the processed data estimated in step 906 (step 902). If it is determined that the difference is larger than the processed data size in step 902, data of the size of data to be read, estimated in step 906, is read from the reception buffer of the LAN side (step 903). If it is determined that the difference is not larger than the processed data size in step 902, data of a size corresponding to a difference (a vacant buffer size) between a difference (a total value of untransmitted data and ACK awaiting data) between wan_right_sbuf 526 and wan_left_send 524, and the transmission buffer size wan_sbuf_size of the WAN side is read from the reception buffer of the LAN side only in a case where data is not processed (step 904). Whether or not data is processed may be defined in advance or for each kind of packet. After the data is read, the size of the read data is added to lan_left_rbuf 508 (step 905). After step 905, the flow returns to step 901. In addition, when the data writing portion 603 writes data, wan_right_sbuf 526 increases by the size of the written data.

Each process of FIG. 10 is performed by the data reading portion 606.

When the process starts (step 1000), first, the data reading portion 606 compares whether or not wan_left_recv 516 is larger than wan_left_rbuf 515 so as to determine whether or not there is arranged data in the reception buffer of the WAN side (step 1001). If it is determined that wan_left_recv 516 is not larger than wan_left_rbuf 515 in step 1001, that is, there is no arranged data, step 1001 is repeatedly performed. On the other hand, if it is determined that wan_left_recv 516 is larger than wan_left_rbuf 515 in step 1001, that is, there is arranged data, then, the size of data to be read and the data size after data processing are estimated from leading data of arranged data present between wan_left_recv 516 and wan_left_rbuf 515 (step 1006). As the leading data, a Transport Layer Security (TLS)/Secure Socket Layer (SSL) header, a Server Message Block (SMB) header, or the like may be used.

Next, it is compared whether or not a difference (a vacant buffer size) between a difference (a total value of untransmitted data and ACK awaiting data) between lan_right_sbuf 523 and lan_left_send 521, and the transmission buffer size lan_sbuf_size of the LAN side is larger than the size of the processed data estimated in step 1006 (step 1002). If it is determined that the difference is larger than the processed data size in step 1002, data of the size of data to be read, estimated in step 1006, is read from the reception buffer of the WAN side (step 1003). If it is determined that the difference is not larger than the processed data size in step 1002, data of a size corresponding to a difference (a vacant buffer size) between a difference (a total value of untransmitted data and ACK awaiting data) between lan_right_sbuf 523 and lan_left_send 521, and the transmission buffer size lan_sbuf_size of the LAN side is read from the reception buffer of the WAN side only in a case where data is not processed (step 1004). After the data is read, the size of the read data is added to wan_left_rbuf 515 (step 1005). After step 1005, the flow returns to step 1001. In addition, when the data writing portion 604 writes data, lan_right_sbuf 523 increases by the size of the written data.

Figure 7A:
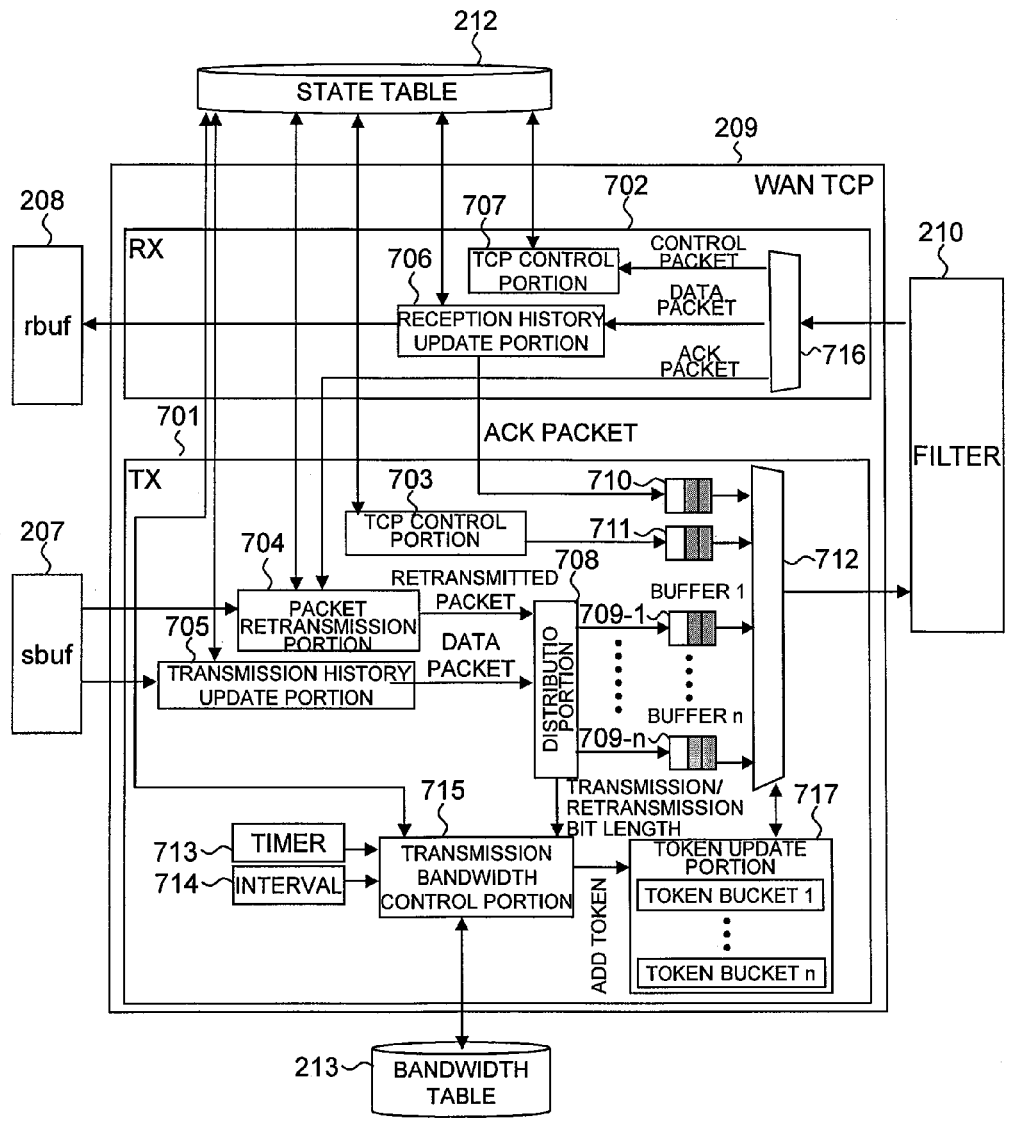
FIG. 7A is a block diagram of a WAN side TCP unit 209.

FIG. 7A is a block diagram of the TCP module 209 of the WAN side.

The TCP module 209 which realizes TCP communication includes an RX unit (reception unit) 702 which performs a reception process and a TX unit (transmission unit) 701 which performs a transmission process. The RX unit 702 includes a packet analysis portion 716 which divides a received packet into a TCP control packet, a packet with data, and an ACK packet, a TCP control portion 707 which changes TCP states lan_state 507 and wan_state 514 of the state table 212 on the basis of a received TCP control packet, and a reception history update portion 706 which changes the buffer management pointer of the state table 212 and returns an ACK packet on the basis of the transmission sequence number SEQ 423 and the reception sequence number ACK 424 of a received data packet.

The TX unit 701 includes a TCP control portion 703 which transmits a TCP control packet by using the TCP states lan_state 507 and wan_state 514 of the state table 212, a packet retransmission portion 704 which changes the buffer management pointer of the state table 212 on the basis of a received ACK packet, reads data from the transmission buffer sbuf 207 by using partial acknowledgements left_edge_1 to 4 (433, 435, 436, and 439) and right_edge_1 to 4 (434, 436, 438, and 440) described in the received ACK packet, and retransmits a packet, and the transmission history update portion 705 which transmits a packet carrying data read from the transmission buffer sbuf 207 therein and changes the buffer management pointer of the state table 212. In addition, the TX unit 701 includes a distribution portion 708 which receives a retransmitted packet and a data packet which are distributed to buffers 1 to n (709-1 to 709-*n*), and notifies the transmission bandwidth control portion 715 of transmission/retransmission bit length of each TCP connection, a timer 713 which generates a current time point of which the transmission bandwidth control portion 715 is notified, an interval storage portion 714 which preserves an interval time of which the transmission bandwidth control portion 715 is notified, the transmission bandwidth control portion 715 which controls the bandwidth table 213 and notifies a token update portion 717 of a token size of each TCP connection, the token update portion 717 which manages a token bucket for each TCP connection and notifies a multiplexer 712 of transmittable connection, and the multiplexer 712 and buffers 709 to 711 which aggregate and output an ACK packet, a TCP control packet, a retransmitted packet, and a data packet in a FIFO manner.

Figure 7B:
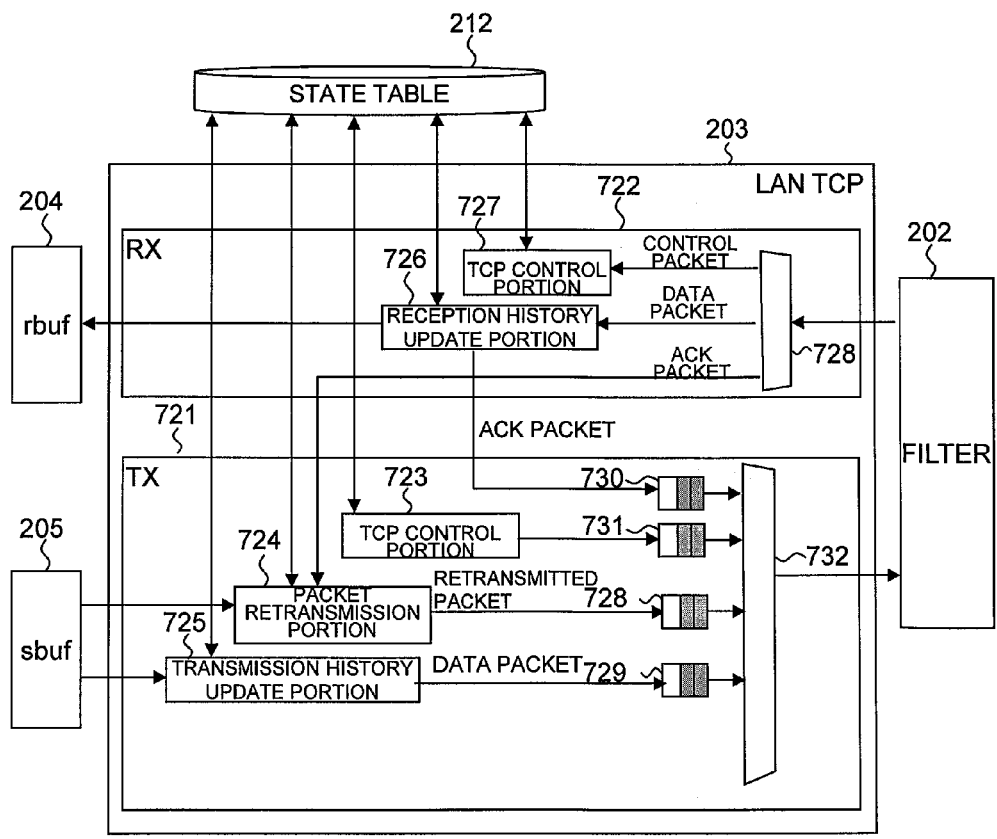
FIG. 7B is a block diagram of a LAN side TCP module 203.

FIG. 7B is a block diagram of the TCP module 203 of the LAN side.

The TCP module 203 which realizes TCP communication includes an RX unit 722 which performs a reception process and a TX unit 721 which performs a transmission process. The RX unit 722 includes a packet analysis portion 728 which divides a received packet into a TCP control packet, a packet with data, and an ACK packet, a TCP control portion 727 which changes TCP states lan_state 507 and wan_state 514 of the state table 212 on the basis of a received TCP control packet, and the reception history update portion 726 which changes the buffer management pointer of the state table 212 and returns an ACK packet on the basis of the transmission sequence number SEQ 423 and the reception sequence number ACK 424 of a received data packet.

The TX unit 721 includes a TCP control portion 723 which transmits a TCP control packet by using the TCP states lan_state 507 and wan_state 514 of the state table 212, a packet retransmission portion 724 which changes the buffer management pointer of the state table 212 on the basis of a received ACK packet, reads data from the transmission buffer sbuf 205 by using partial acknowledgements left_edge_1 to 4 (433, 435, 436, and 439) and right_edge_1 to 4 (434, 436, 438, and 440) described in the received ACK packet, and retransmits a packet, a transmission history update portion 725 which transmits a packet carrying data read from the transmission buffer sbuf 205 therein and changes the buffer management pointer of the state table 212, and a multiplexer 732 and buffers 729 to 731 which aggregate and output an ACK packet, a TCP control packet, a retransmitted packet, and a data packet in a FIFO manner.

FIG. 8 shows a format of the bandwidth table 213.

The bandwidth table 213 records, for each connection, a transmission bandwidth and a control bandwidth before an old reference time point, a transmission bandwidth, a retransmission bandwidth, and a control bandwidth before a reference time point, a reference time point, and, a transmission bit integrated value, a retransmission bit integrated value, and a control bandwidth after a reference time point. The control bandwidth after the reference time point indicates a control bandwidth (indicated by a token in the present embodiment) at a current time point. The transmission bandwidth after the reference time point indicates a transmission bandwidth (indicated by snd in the present embodiment) at a current time point and is obtained by dividing the transmission bit integrated value after the reference time point by an interval time. The retransmission bandwidth after the reference time point indicates a retransmission bandwidth (indicated by its in the present embodiment) at a current time point and is obtained by dividing the retransmission bit integrated value after the reference time point by an interval time. The control bandwidth, the transmission bandwidth, and the retransmission bandwidth before the reference time point indicate a control bandwidth, a transmission bandwidth, and a retransmission bandwidth (indicated by old_token, old_snd, and old_rts in the present embodiment) until right before the reference time point. In addition, a reference time point which is used one step before a reference time point which is currently being used is referred to as an old reference time point, and, the control bandwidth, the transmission bandwidth, and the retransmission bandwidth before the old reference time point indicate a control bandwidth, a transmission bandwidth, and a retransmission bandwidth (indicated by old_old_token, old_old_snd, and old_old_rts in the present embodiment) until right before the old reference time point. For example, the retransmission ratio old_rts_ratio before the reference time point is obtained by old_rts/old_old_snd. In addition, the current retransmission ratio rts_ratio after the reference time point is obtained by rts/old_snd. Further, there are cases where wan_rtt 519 described in the state table 212 is used instead of the interval time of the interval storage portion 714.

Each information piece of the bandwidth table 213 is updated by, for example, the transmission bandwidth control portion 715. In addition, the transmission bandwidth control portion 715 obtains a transmission bandwidth (a transmission throughput) snd 531, a retransmission bandwidth (retransmission throughput) rts, and a retransmission ratio rts_ratio 528 from the transmission bit integrated value, the retransmission bit integrated value, and the like, so as to be stored in the state table 212.

Figure 18:
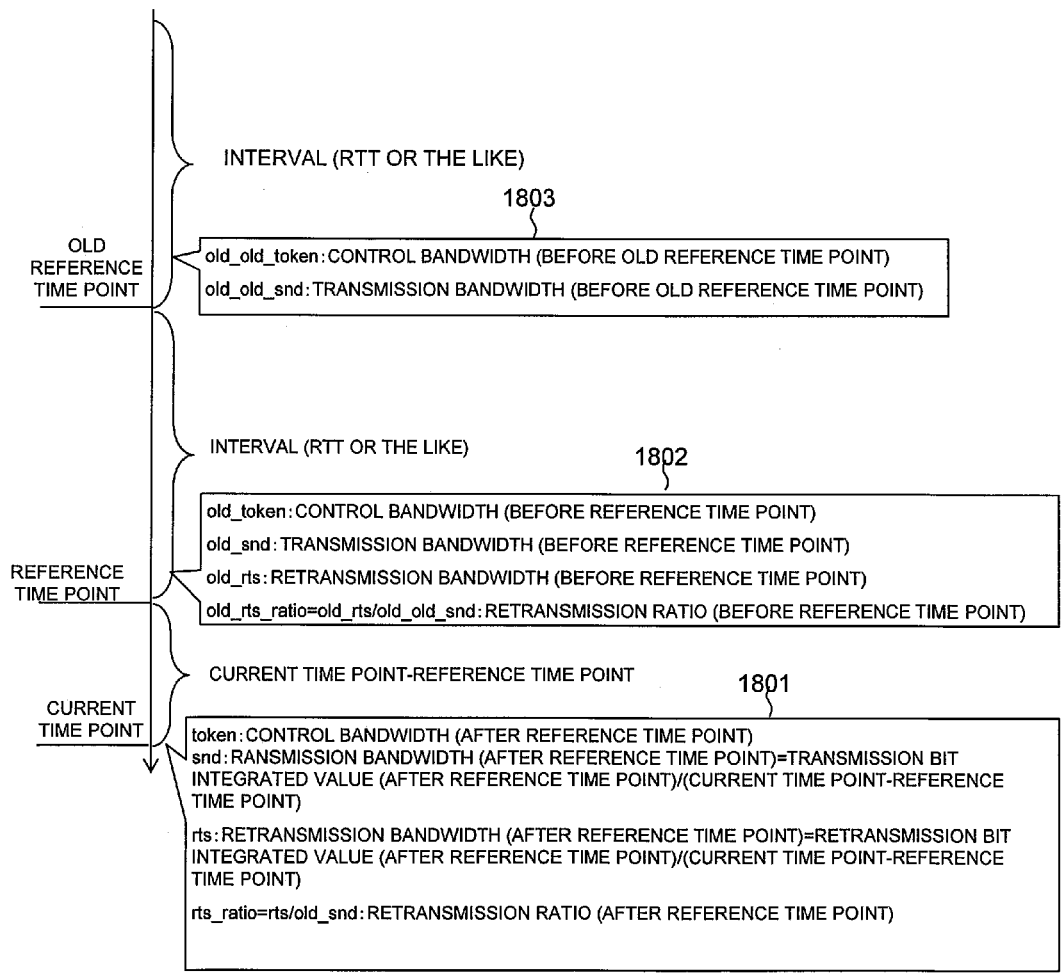
FIG. 18 is a diagram illustrating an old reference time point, a reference time point, and a current time point.

FIG. 18 shows a relationship between an old reference time point, a reference time point, and a current time point. A difference between the old reference time point and the reference time point corresponds to an interval time. A control bandwidth, a transmission bandwidth, and a retransmission bandwidth in an interval time before the old reference time point are respectively indicated by old_old_token, old_old_snd, and old_old_rts (1803). A control bandwidth, a transmission bandwidth, and a retransmission bandwidth from the old reference time point to the reference time point are respectively indicated by old_token, old_snd, and old_rts (1802). A control bandwidth, a transmission bandwidth, and a retransmission bandwidth from the reference time point to the current time point are respectively indicated by token, snd, and its (1801). The interval time may use a variable value such as, for example, RTT, or may use a fixed value.

The transmission bandwidth control portion 715 determines a control bandwidth (token) by using the values described in the bandwidth table 213 so as to be sent to the token update portion 717. In addition, rts_ratio 528 of the state table 212 is updated.

Figure 17:
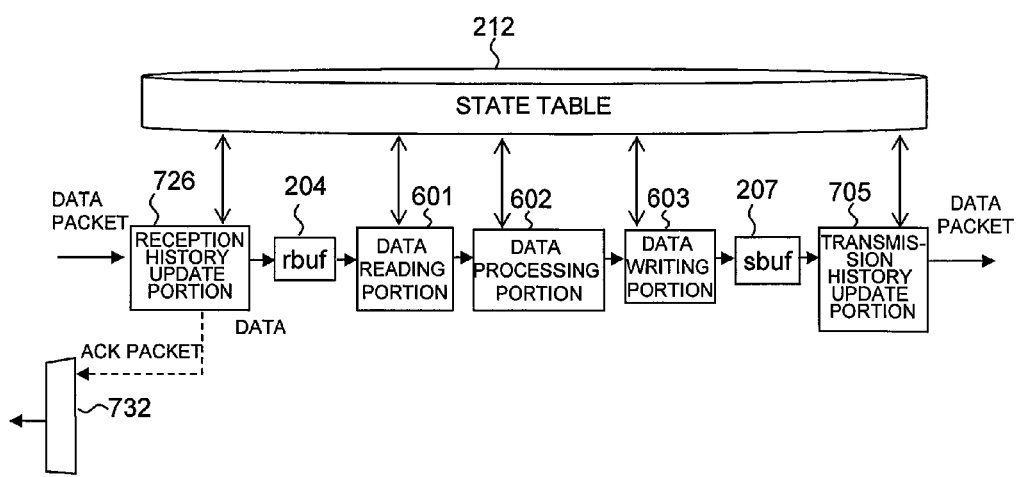
FIG. 17 is a diagram illustrating the flow of a packet when a packet with data is received from the LAN side.

FIG. 17 shows a flow of a packet when a packet with data is received from the LAN side.

A packet with data which arrives from the LAN side arrives at the reception history update portion 726. The reception history update portion 726 returns an ACK packet to the LAN side via the aggregation unit 732 and accumulates the data described in the packet in the LAN side reception buffer rbuf 204. In addition, the pointer of the state table 212 is updated based on the size of the accumulated data. The data reading portion 601 reads arranged data which is accumulated in the LAN side reception buffer rbuf 204 so as to be transferred to the data processing portion 602. In addition, the pointer of the state table 212 is updated based on the size of the read data. The data processing portion 602 processes data which is transferred to the data writing portion 603. Further, the size of data on which processing is in progress of the state table 212 is updated based on the size of the data on which processing is in progress. The data writing portion 603 writes the processed data in the WAN side transmission buffer sbuf 207. In addition, the pointer of the state table 212 is updated based on the size of the written data. The data written in the WAN side transmission buffer sbuf 207 is read by the transmission history update portion 705 and is transmitted to the WAN side as a packet with data.

The reception history update portion 726 calculates a remaining capacity of the reception buffer by subtracting a difference between lan_right_recv 510 and lan_left_rbuf 508 from the maximum value of the LAN side reception buffer 204. When the size of the payload 450 of the received data is equal to or less than the remaining capacity of the reception buffer 204, all data items described in the payload 450 are stored in the reception buffer 204. When the size of the payload 450 is larger than the remaining capacity of the reception buffer 204, only data items corresponding to the remaining capacity of the reception buffer from the head of the payload 450 are stored in the reception buffer 204. When a stored data size is larger than 0, the pointer for managing the reception buffer is updated based on a value of SEQ 423 described in the TCP header 420 of the packet with data and the stored data size. For example, in a case where a value obtained by adding the stored data size to SEQ 423 is larger than lan_right_recv 510, lan_right_recv 510 is changed to the value obtained by adding the stored data size to SEQ 423. Further, the stored data is stored in the LAN side reception buffer 204 so as to be located at the end in lan_right_recv 510. Successively, rwnd 527 is described in win_size 427 of the TCP header 420, and an ACK packet in which lan_left_recv 509 which is one of the reception buffer management pointers is described in ACK 424 of the TCP header 420 is returned to the LAN side.

In addition, in the reception history update portion 726, a value of rwnd 527 is not used in determining whether or not data is stored. For this reason, when a remaining capacity of the reception buffer is larger than 0 even if rwnd 527 is 0, data described in the payload 450 of a packet received after an ACK packet is transmitted is stored in the reception buffer, and an ACK packet which has ACK 424 with an incremented reception sequence number and in which the reception window size is 0 is returned to the LAN side.

The transmission history update portion 705 reads data from wan_right_send 525 up to wan_right_sbuf 526 in the right direction from the WAN side transmission buffer sbuf

207. Here, wan_right_send 525 increases by the size of the read data and moves to the right. In addition, the read data is described in the payload 450, and a packet with data to which the TCP header 420 in which wan_right_send 525 is described in SEQ 423 is added is transmitted to the WAN side.

Figure 12A:
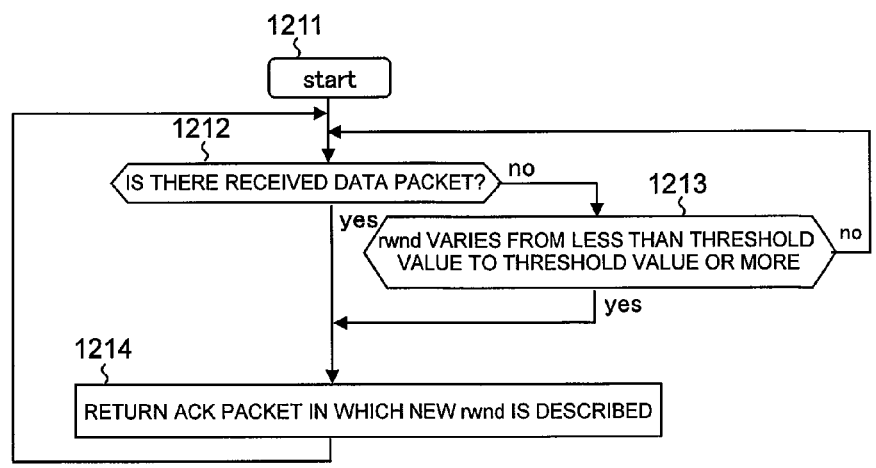
FIG. 12A is a flowchart diagram illustrating a process in which a reception history update portion 726 returns ACK.

FIG. 12A is a flowchart diagram illustrating an example in which the reception history update portion 726 of the LAN side TCP returns ACK.

When the process starts (step 1211), the reception history update portion 726 checks whether or not a data packet is received through polling (step 1212). If there is a received packet, an ACK packet in which new rwnd 527 is obtained and is described in win_size 427 of the TCP header 420 is returned to the LAN side (step 1214). Even in a case where there is no received packet in step 1212, if it is found that rwnd 527 increases from less than a predefined threshold value to the threshold value or more (step 1213), an ACK packet in which new rwnd 527 is obtained and is described in win_size 427 of the TCP header 420 is returned to the LAN side (step 1214). If the variation is not found in step 1213, the flows returns to step 1212.

As shown in FIG. 12A, if the reception history update portion 726 of the LAN side TCP performs the process in step 1213, in a case where rwnd of which the transmission terminal of the LAN side is to be notified exceeds a predefined threshold value even when there is no received data packet, an ACK packet in which rwnd is described can be immediately returned to the transmission terminal of the LAN side. Thereby, the transmission terminal of the LAN side can immediately know that the reception buffer of the LAN side has a vacancy and can resume transmission.

Figure 12B:
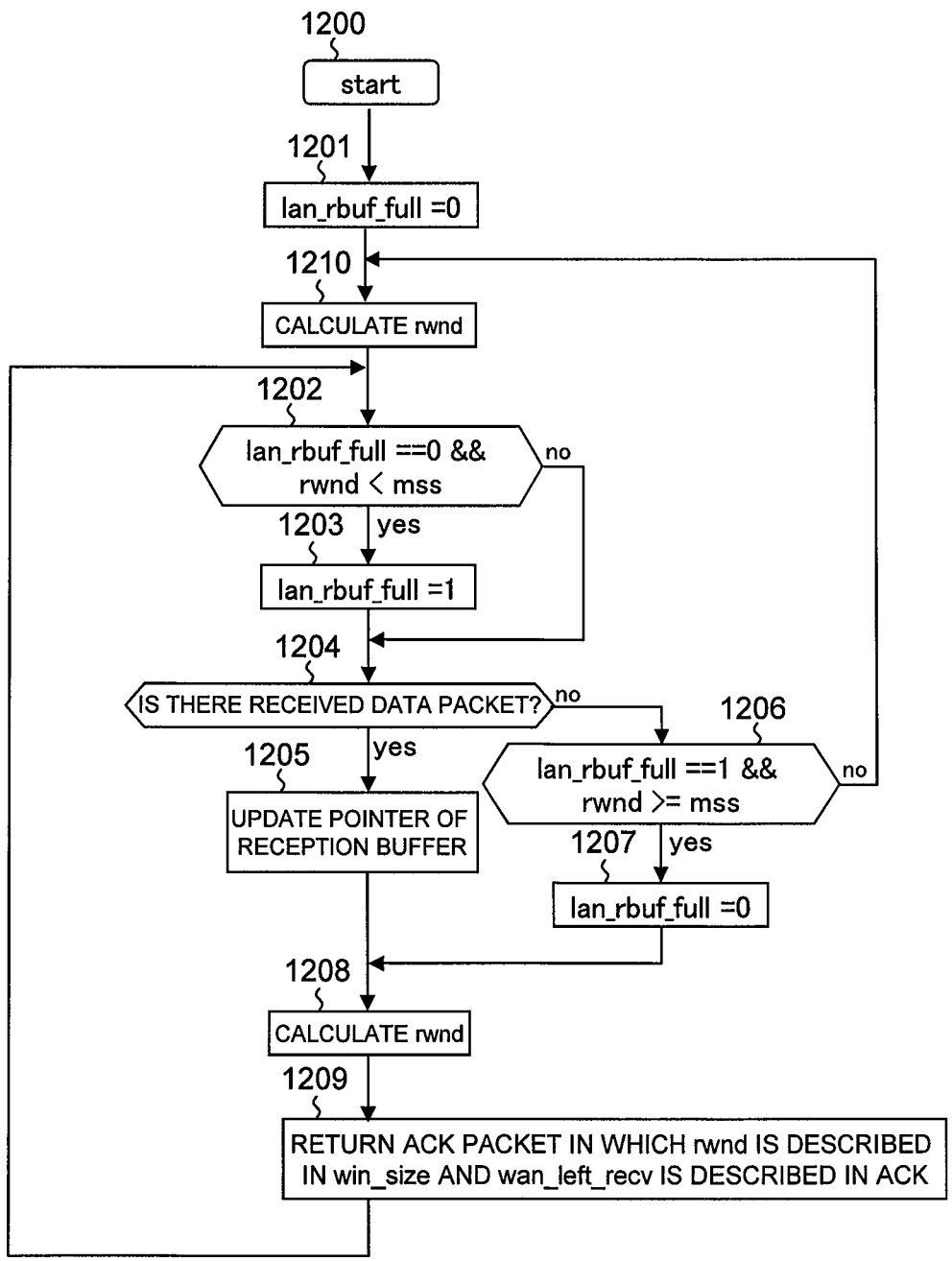
FIG. 12B is a flowchart diagram illustrating a detailed example in which the reception history update portion 726 of a LAN side TCP returns ACK.

FIG. 12B is a flowchart diagram illustrating a more detailed example in which the reception history update portion 726 of the LAN side TCP returns ACK.

When the process starts (step 1200), first, the reception history update portion 726 initializes an internal variable lan_rbuf_full to 0 (step 1201). Next, rwnd 527 is calculated (step 1210). A calculation method of rwnd 527 will be described later with reference to FIGS. 11A to 11D. Next, it is determined whether or not the internal variable lan_rbuf_full is 0, and rwnd 527 is smaller than the maximum segment size (the maximum data size carried in a single packet) mss (corresponding to the above-described threshold value) (step 1202). If in step 1202, it is true, the internal variable lan_rbuf_full is changed to 1 (step 1203), and the flow proceeds to step 1204. If in step 1202, it is false, the flow proceeds to step 1204. In step 1204, it is determined whether or not a new data packet is received. If there is a received packet, the reception buffer management pointer is updated (step 1205). For example, if a value obtained by adding the size of the payload 450 to SEQ 423 is larger than lan_right_recv 510, lan_right_recv 510 is changed to the value obtained by adding the size of the payload 450 to SEQ 423. In addition, rwnd 527 is calculated (step 1208). A calculation method of rwnd 527 will be described later with reference to FIGS. 11A to 11D. On the other hand, if there is no received packet in step 1204, it is determined whether or not the internal variable lan_rbuf_full is 1, and rwnd 527 is equal to or more than the maximum segment size (the maximum data size carried in a single packet) mss (step 1206). If false, the flow returns to step 1210. If true, the internal variable lan_r-buf_full is set to 0 (step 1207), and the flow proceeds to step 1208. In step 1208, rwnd 527 is calculated. Successively, an ACK packet in which rwnd 527 is described in win_size 427 of the TCP header 420 and lan_left_recv 509 which is one of the reception buffer management pointers is described in ACK 424 of the TCP header 420 is returned (step 1209).

As shown in FIG. 12B, if the reception history update portion 726 of the LAN side TCP performs the processes in steps 1206 and 1207 (and the processes in steps 1202 and 1203), in a case where rwnd of which the transmission terminal of the LAN side is to be notified exceeds MSS even when there is no received data packet, an ACK packet in which rwnd is described can be immediately returned to the transmission terminal of the LAN side. Thereby, the transmission terminal of the LAN side can immediately know that the reception buffer of the LAN side has a vacancy and can resume transmission.

Next, a description will be made of calculation of rwnd 527. For example, the calculation corresponds to the processes in step 1214 of FIG. 12A and steps 1210 and 1208 of FIG. 12B.

Figure 11A:
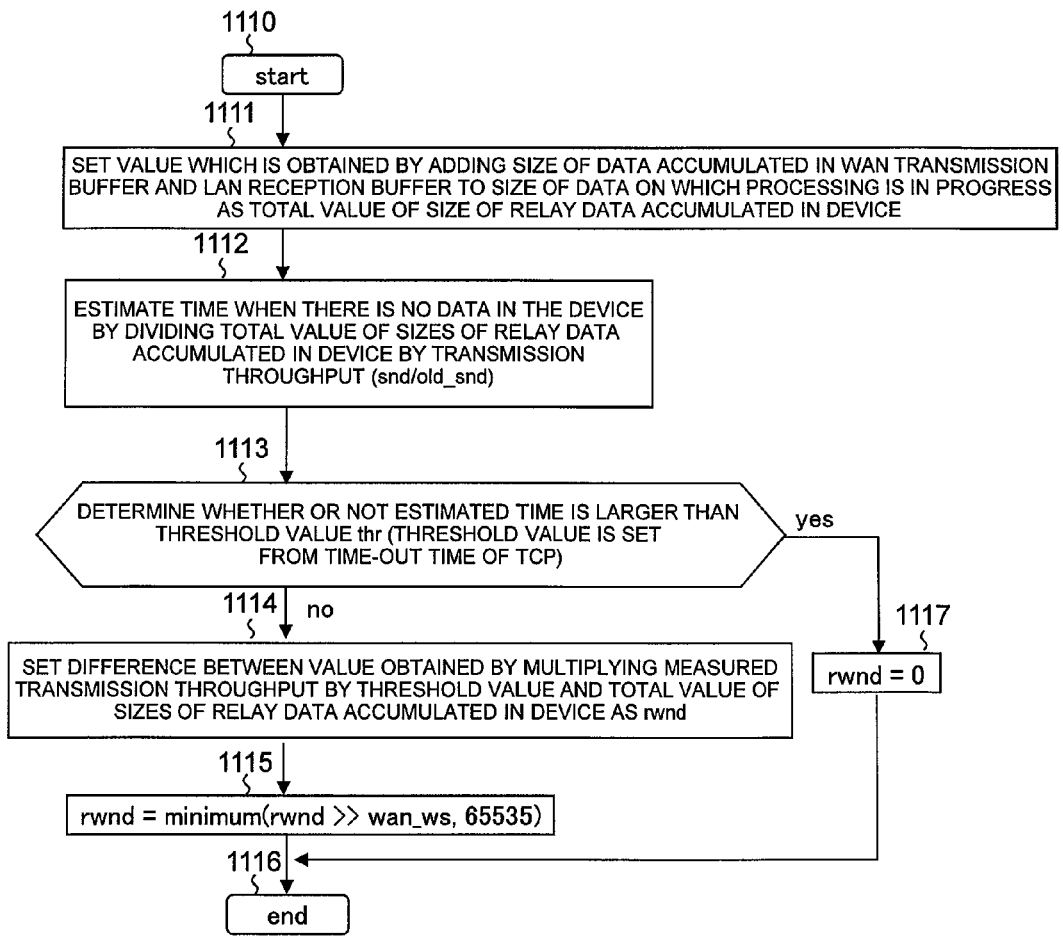
FIG. 11A is a flowchart diagram (1) illustrating a process in which the device determines rwnd described in an ACK packet which is returned to the transmission terminal of the LAN side.

FIG. 11A is a flowchart diagram illustrating an example of the calculation of rwnd 527 performed by the reception history update portion 726 of the LAN side TCP.

When the calculation of rwnd 527 starts (step 1110), a value obtained by adding the size (accumulated data size) of data accumulated in the WAN transmission buffer sbuf 207 and the LAN reception buffer rbuf 204 to the size of data on which processing is in progress in the proxy 206 is set as a total value of sizes of relay data accumulated in the device (step 1111). Each data size may be read from the state table 212, or may be obtained from data which is read from the state table 212. Further, time when there is no data in the device is estimated by dividing the total value of sizes of relay data accumulated in the device by a measured transmission throughput (snd or old_snd) of the WAN side (step 1112). In addition, it is determined whether or not the estimated time is larger than a predefined threshold value thr (step 1113). The threshold value may be set from a time-out time of the TCP. For example, the time-out time may be used as the threshold value as it is, or may be multiplied by a coefficient. If it is determined that the estimated time is larger than the predetermined threshold value in step 1113, rwnd 527 is set to 0 (step 1117), and the process finishes (step 1116). If it is determined that the estimated time is not larger than the predetermined threshold value in step 1113, a difference between a multiplication value of the measured transmission throughput and the threshold value, and the total value of sizes of relay data accumulated in the device, is set as rwnd 527 (step 1114). In addition, a smaller value of a value obtained by shifting rwnd 527 to the right by wan_ws 518 and 65535 is set as new rwnd 527 (step 1115), and the process finishes (step 1116). For example, in a case where rwnd 527 exceeds the maximum value 65535 which can be described in ACK in step 1115, rwnd 527 becomes the maximum value 65535. In addition, the maximum value which can be described in ACK may be set to other values.

The process performed by the reception history update portion 726 of the LAN side TCP module 203 shown in FIG. 11A realizes means for setting a reception window size which is described in an ACK packet returned to the LAN side on the basis of a total value of relay data accumulated in the device and a measured transmission throughput of the WAN side. In addition, means for setting a value of the reception window size which is described in an ACK packet transmitted to the LAN side to 0 is realized when a value obtained by dividing a total value of accumulated relay data by a measured transmission throughput is equal to or more than a certain threshold value.

In addition, PTL 2 does not disclose means for calculating rwnd 527 on the basis of a transmission throughput of the WAN side measured by the transmission bandwidth control portion 715 and the size of relay data accumulated in the device as shown in FIG. 11A, for example, in the reception history update portion 726, or means for returning an ACK packet using a variation in rwnd 527 as a trigger as shown in FIG. 12. The above-described effects can be achieved for the first time by using the calculation method of rwnd 527 shown in FIG. 11A and the ACK returning method shown in FIG. 12.

Figure 11B:
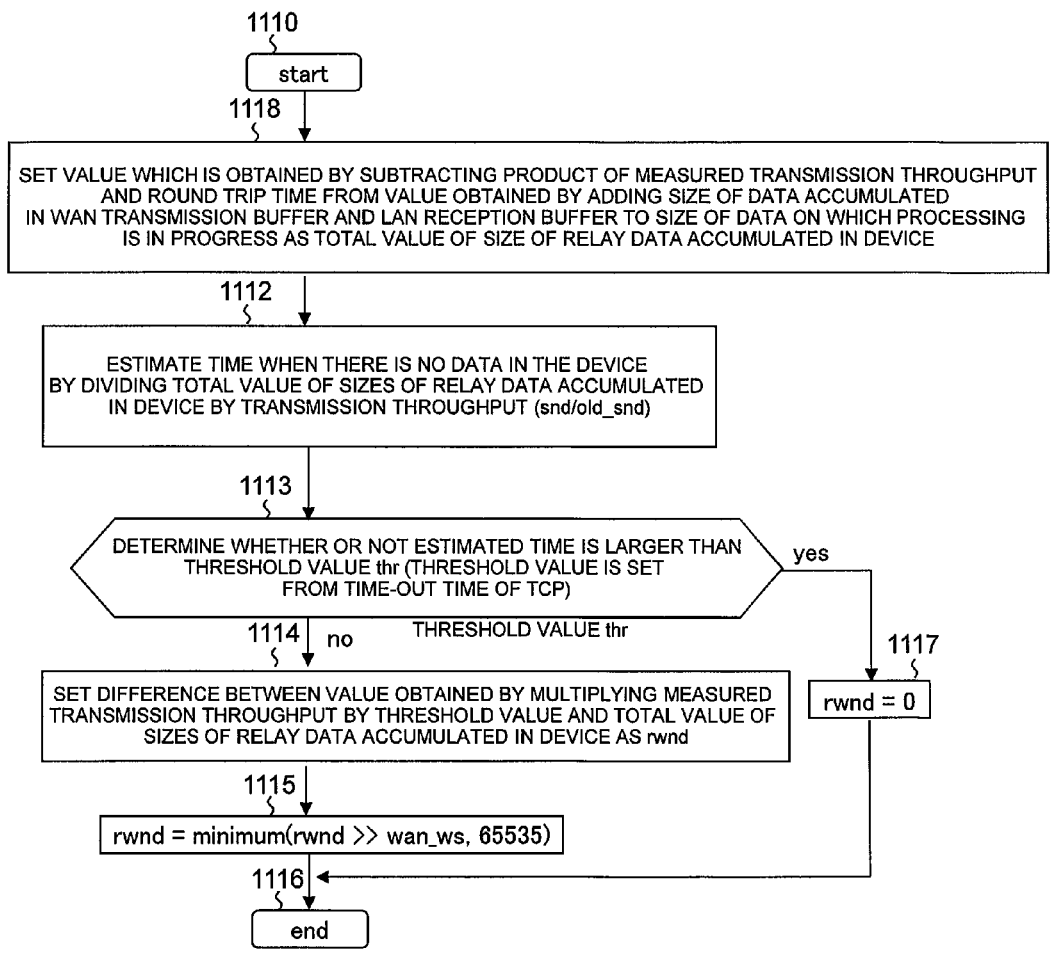
FIG. 11B is a flowchart diagram (2) illustrating a process in which the device determines rwnd described in an ACK packet which is returned to the transmission terminal of the LAN side.

FIG. 11B is a flowchart diagram illustrating another example of the calculation of rwnd 527 performed by the reception history update portion 726 of the LAN side TCP module 203.

The overall flow of processes is the same as in FIG. 11A, but step 1111 is changed to step 1118, and a method of obtaining a total value of relay data accumulated in the device is different. A value obtained by subtracting a product of a measured transmission throughput and a round trip time from a total value of the size of data accumulated in the WAN transmission buffer sbuf and the LAN reception buffer rbuf and the size of data on which processing is in progress is set as a total value of relay data accumulated in the device (step 1118). Thereby, the larger the round trip time RTT is, the smaller the total value of relay data is estimated to be. Therefore, rwnd is set to be large, and rwnd 527 can be controlled such that the TCP communication can use a large amount of buffer space. Thereby, the reception window size rwnd 527 can be calculated in consideration of the RTT.

The process performed by the reception history update portion 726 of the LAN side TCP module 203 shown in FIG. 11B realizes means for calculating a value of a reception window size which is described in an ACK packet transmitted to the LAN side on the basis of a total value of relay data accumulated in the device, a measured transmission throughput of the WAN side, and a round trip time. In addition, means for setting a value of the reception window size which is described in an ACK packet transmitted to the LAN side to 0 is realized when a value, which is obtained by dividing a value obtained by subtracting a multiplication value of a measured transmission throughput of the WAN side and a round trip time from a total value of relay data which is accumulated in the device and on which processing is in progress by the measured transmission throughput of the WAN side, is equal to or more than a certain threshold value.

Figure 11C:
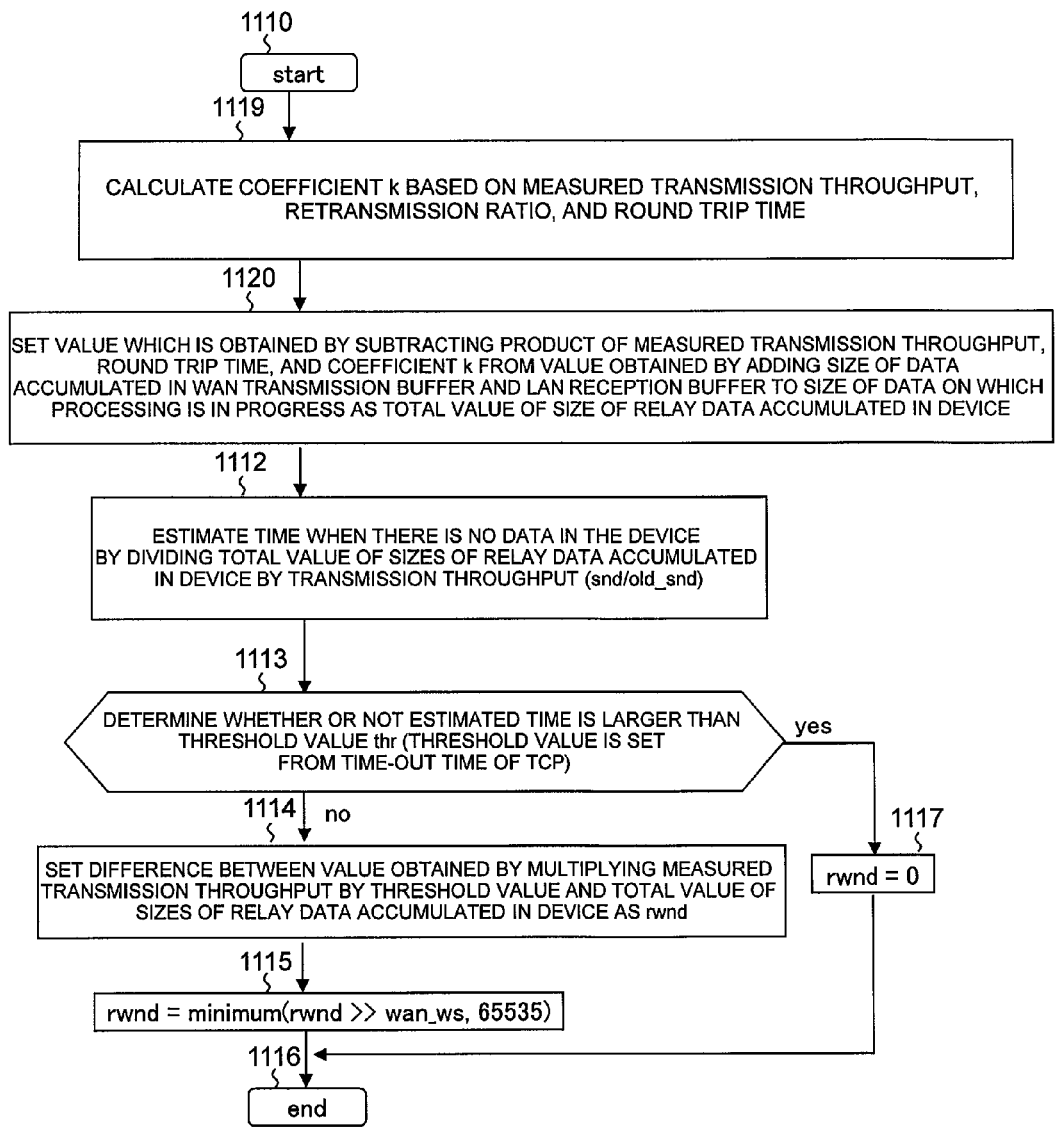
FIG. 11C is a flowchart diagram (3) illustrating a process in which the device determines rwnd described in an ACK packet which is returned to the transmission terminal of the LAN side.

FIG. 11C is a flowchart diagram illustrating still another example of the calculation of rwnd 527 performed by the reception history update portion 726 of the LAN side TCP module 203.

The overall flow of processes is the same as in FIG. 11B, but step 1118 is changed to steps 1119 and 11120, and a method of obtaining a total value of relay data accumulated in the device is different. First, in step 1119, a coefficient k is calculated based on a measured transmission throughput, a retransmission ratio, and a round trip time. For example, the coefficient k is obtained such that, if the transmission throughput, the round trip time, and the retransmission ratio become larger, the coefficient k also increases. A more detailed method of obtaining the coefficient is exemplified in FIG. 11D. In addition, in step 1120, a value, which is obtained by subtracting a product of the measured transmission throughput, the round trip time, and the coefficient k from a value obtained by adding the size of data accumulated in the WAN transmission buffer sbuf and the LAN reception buffer rbuf to the size of data on which processing is in progress, is set as a total value of relay data accumulated in the device. Thereby, as the retransmission ratio is larger, rwnd 527 can be controlled such that the TCP communication can use a larger amount of buffer space. Therefore, the reception window size rwnd 527 can be calculated in consideration of the RTT. For example, as the retransmission ratio becomes larger, rwnd 527 set in step 1114 becomes larger than in the other examples, and thus data received from the terminal is easily accumulated in the buffer. If the retransmission ratio is large, data including data for retransmission is required to be accumulated in the buffer, and, thus, in this example, an amount of data accumulated in the buffer can be made to be larger than in the other examples.

The process performed by the reception history update portion 726 of the LAN side TCP module 203 shown in FIG. 11C realizes means for setting a value of a reception window size which is described in an ACK packet transmitted to the LAN side on the basis of the size of data accumulated in the relay device, a transmission throughput of the WAN side, a round trip time, and a retransmission ratio of the WAN side. In addition, means for setting a value of the reception window size which is described in an ACK packet transmitted to the LAN side to 0 is realized when a coefficient is calculated from a transmission throughput of the WAN side, a round trip time, and a retransmission ratio of the WAN side, and a value, which is obtained by dividing a value obtained by subtracting a multiplication value of the transmission throughput of the WAN side, the round trip time, and the coefficient from the size of data accumulated in the relay device by the transmission throughput of the WAN side, is equal to or more than a certain threshold value.

Figure 11D:
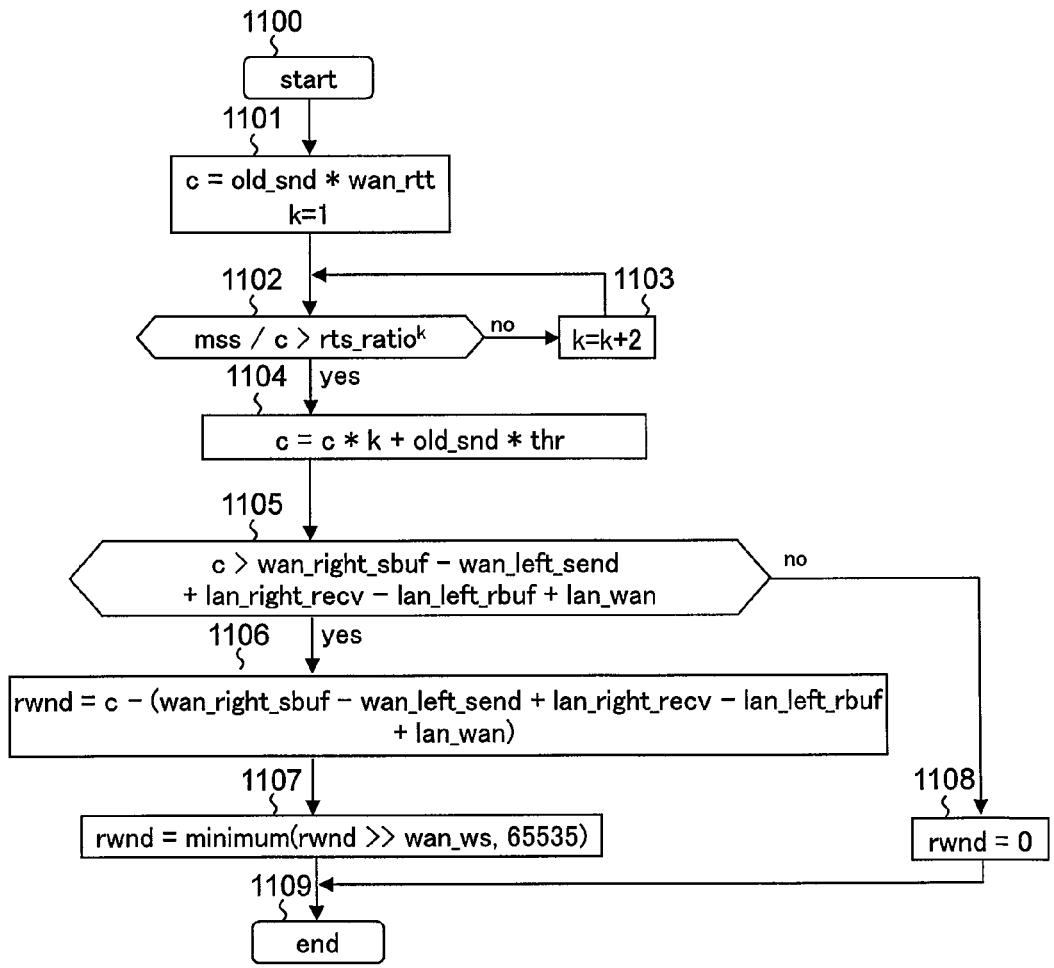
FIG. 11D is a flowchart diagram illustrating a more detailed example of rwnd 527.

FIG. 11D is a flowchart diagram illustrating another more detailed example of the calculation of rwnd 527 performed by the reception history update portion 726 of the LAN side TCP module 203.

When the calculation of rwnd 527 starts (step 1100), an internal variable c is calculated by multiplying the transmission bandwidth old_snd 532 before a reference time point by the RTT average value wan_rtt 519, and, further, 1 is assigned to an interval variable k (step 1101). Next, it is determined whether or not a value obtained by dividing the maximum segment size (the maximum data size carried in a single packet) mss by the internal variable c is larger than a value obtained by raising rts_ratio 528 to the k-th power (step 1102). If the value is smaller, 2 is added to k (step 1103), and step 1102 is repeatedly performed. If step 1102 is true, the internal variable c is updated to c=c*k+old_snd*thr (step 1104). Further, it is determined whether or not the internal variable c is larger than a sum of the accumulated data size of the WAN side transmission buffer, the accumulated data size of the LAN side reception buffer, and the size of data on which processing is in progress, wan_right_sbuf 526-wan_left_send 524+lan_right_recv 510-lan_left_rbuf 508+lan_wan 529 (step 1105). If c is smaller, rwnd is set to 0 (step 1108), and the process finishes (step 1109). If step 1105 is true, a difference between the internal variable c and the sum of the accumulated data size of the WAN side transmission buffer, the accumulated data size of the LAN side reception buffer, and the size of data on which processing is in progress, wan_right_sbuf 526-wan_left_send 524+lan_right_recv 510-lan_left_rbuf 508+lan_wan 529, is set as a value of rwnd 527 (step 1106). Further, a smaller value of a value obtained by shifting rwnd 527 to the right by wan_ws 518 and 65535 is set as a new value of rwnd 527 (step 1107), and the process finishes (step 1109).

Thereby, as the RTT or the retransmission ratio is larger, rwnd 527 can be controlled such that the TCP communication can use a larger amount of buffer space. Therefore, the reception window size rwnd 527 can be calculated in consideration of the RTT.

By using the calculation method of an rwnd value shown in FIG. 11D, it is possible to control a value of the reception window size (rwnd) described in an ACK packet returned to the transmission terminal of the LAN side on the basis of a transmission throughput old_snd of the TCP communication of the WAN side, a retransmission ratio rts_ratio, an RTT, the size of unarranged data and the size of arranged data of the LAN side, the size of untransmitted data of the transmission buffer of the WAN side, the size of ACK awaiting data, and the size of data on which processing is in progress.

By using the calculation methods of an rwnd value shown in FIGS. 11A to 11D, it is possible to prevent the transmission terminal of the LAN side from transmitting too much data when a line bandwidth of the WAN side is smaller than a line bandwidth of the LAN side. Thereby, it is possible to prevent a long communication stop time, and time-out and forced cancellation of connection according thereto, due to the transmission buffer of the WAN side and the reception buffer of the LAN side being full.

Further, since steps 1206 and 1207 of FIG. 12B are provided, if rwnd of which the transmission terminal of the LAN side is to be notified exceeds MSS even when there is no received data packet, an ACK packet in which rwnd is described can be immediately returned to the transmission terminal of the LAN side. Thereby, the transmission terminal of the LAN side can immediately know that the reception buffer has a vacancy, and thus can resume transmission.

Effects of the devices 101 and 102 will be described with reference to FIGS. 15 and 16.

Figure 15:
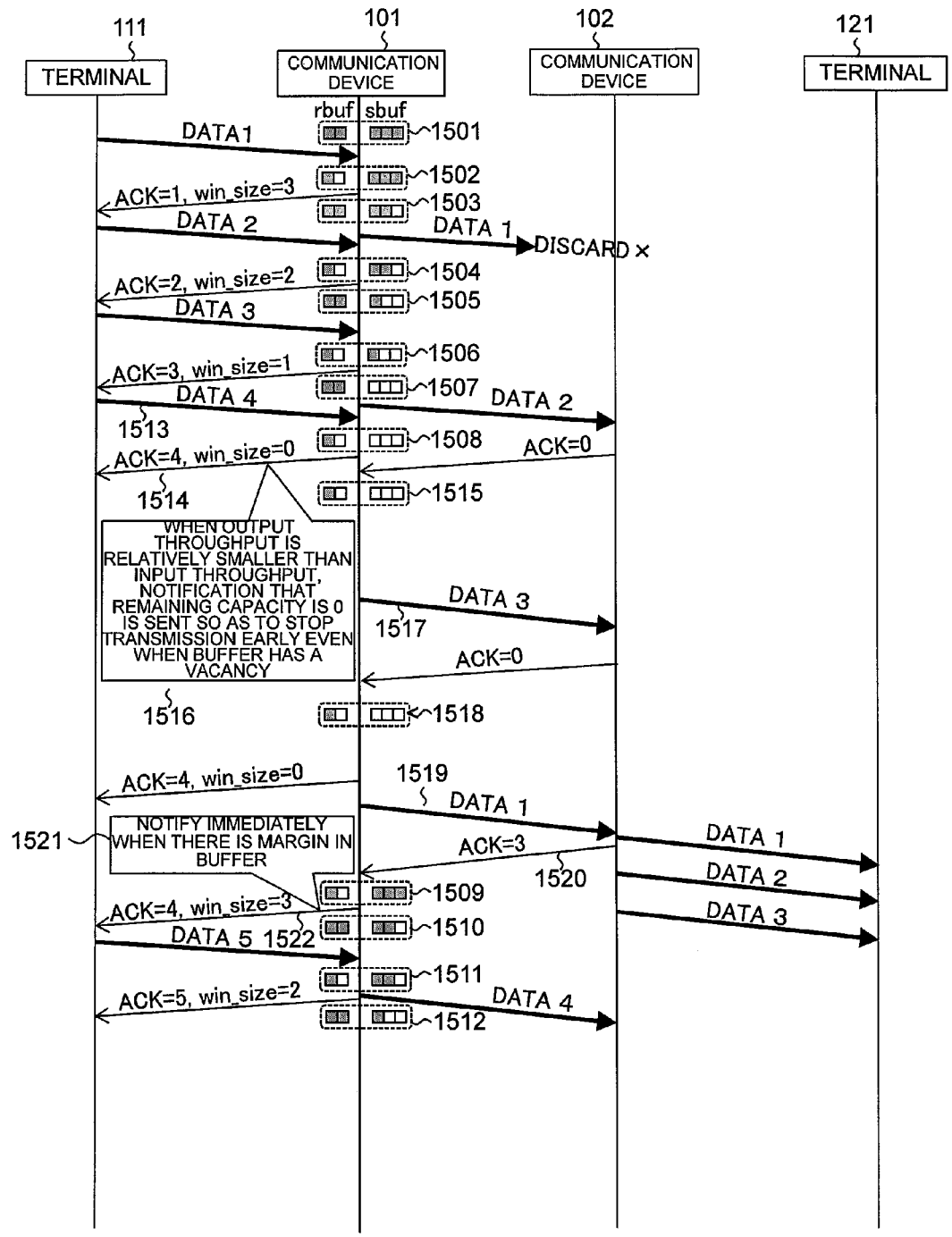
FIG. 15 is a sequence diagram illustrating effects of the present application.

FIG. 15 is a sequence diagram when the devices 101 and 102 relay communication between the terminal 111 and the terminal 121. FIG. 16 shows transitions of a LAN bandwidth 1601 between the terminal 111 and the device 101 and a WAN bandwidth 1602 between the device 101 and the device 102.

In this example, the device 101 includes a reception buffer rbuf which can accumulate two packets on the LAN side and a transmission buffer sbuf which can accumulate three packets on the WAN side (1501). When a first data packet is transmitted from the terminal 111, a single packet is accumulated in the reception buffer of the LAN side (1502). After the first data packet is received, the device 101 returns an ACK packet in which ACK=1 indicating that the first data has been received and win_size=3 calculated based on a control bandwidth, an RTT, and a retransmission ratio of the WAN side and use circumstances of the buffer are described, to the terminal 111. Here, win_size corresponds to the above-described rwnd. The first data accumulated in the reception buffer of the LAN side is transferred to the transmission buffer of the WAN side (1503). The first data is transferred to the transmission buffer of the WAN side and is then sent to the WAN side, but is assumed to be discarded here. If the data is discarded, the control bandwidth of the WAN side is reduced.

Next, when a second data packet is transmitted from the terminal 111 of the LAN side, a single packet is accumulated in the reception buffer rbuf of the LAN side (1504). After the second data packet is received, the device 101 calculates win_size based on the control bandwidth, the RTT, and the retransmission ratio of the WAN side and the use circumstances of the buffer. Since the control bandwidth of the WAN side is reduced and a buffer use amount increases, win_size is reduced. The device 101 returns an ACK packet in which ACK=2 indicating the second data has been received and reduced win_size=2 are described to the terminal 111. The second data accumulated in the reception buffer of the LAN side is transferred to the transmission buffer of the WAN side (1505). Since the first data is discarded and the control bandwidth of the WAN side is still small, the second data is transferred to the transmission buffer of the WAN side, then is not transmitted to the WAN side for the time being, and is accumulated therein.

Next, when a third data packet is transmitted from the terminal 111 of the LAN side, a single packet is accumulated in the reception buffer rbuf of the LAN side (1506). After the third data packet is received, the device 101 calculates win_size based on the control bandwidth, the RTT, and the retransmission ratio of the WAN side and the use circumstances of the buffer. Since a buffer use amount increases in a state in which the control bandwidth of the WAN side is reduced, win_size is reduced. The device 101 returns an ACK packet in which ACK=3 indicating the third data has been received and reduced win_size=1 are described to the terminal 111. The third data accumulated in the reception buffer of the LAN side is transferred to the transmission buffer of the WAN side (1507). Since the first data is discarded and the control bandwidth of the WAN side is still small, the third data is transferred to the transmission buffer of the WAN side, then is not transmitted to the WAN side for the time being, and is accumulated therein. The second data which remained accumulated at a previous time is transmitted to the WAN side, for example, here.

Next, when a fourth data packet 1513 is transmitted from the terminal 111 of the LAN side, a single packet is accumulated in the reception buffer of the LAN side (1508). After the fourth data packet 1513 is received, the device 101 calculates win_size based on the control bandwidth, the RTT, and the retransmission ratio of the WAN side and the use circumstances of the buffer. Since a buffer use amount increases in a state in which the control bandwidth of the WAN side is reduced, win_size is reduced. The device 101 returns an ACK packet (1514) in which ACK=4 indicating that the fourth data has been received and reduced win_size=0 are described to the terminal As such, when the output throughput to the device 102 of the WAN side from the device 101 is relatively smaller than the input throughput to the device 101 from the terminal 111 of the LAN side, an ACK packet in which win_size=0 indicating that a buffer remaining capacity is 0 is described is transmitted to the terminal 111 earlier than in the method in the related art shown in FIG. 13 even if there is a vacancy in the reception buffer of the LAN side (1516). The terminal 111 which has received the ACK packet of win_size=0 determines that the reception buffer of the LAN side is full and stops transmission of data. Thereby, it is possible to decrease the input throughput to the device 101 from the terminal 111 of the LAN side and to thereby reduce a data accumulation amount in the buffer when transmission of data stops.

The fourth data accumulated in the reception buffer of the LAN side is not transferred since the transmission buffer of the WAN side is full (1515). Since the data item 1 is not transmitted even if ACK for the data item 2 is returned from the device 102 of the WAN side, the data items 1 to 3 accumulated in the transmission buffer of the WAN side are not deleted and are left (1515). Similarly, thereafter, since the data item 1 is not transmitted even if the third data packet (1517) is transmitted from the device 101 and then ACK for the data item 3 is returned, the data items 1 to 3 accumulated in the transmission buffer of the WAN side are not deleted and are left (1518).

A while after the transmission of the data item 1, the device 101 retransmits the data item 1 (1519). Successively, an ACK packet (1520) of ACK=3 indicating that the data items 1 to 3 have been received is received from the device 102, and, then, the data items 1 to 3 accumulated in the transmission buffer of the WAN side are deleted for the first time (1509). Since up to the third data can be transmitted, the control bandwidth of the WAN side is recovered.

When the data items 1 to 3 accumulated in the transmission and reception buffers are deleted and only the data item 4 remains, win_size is calculated again based on the control bandwidth, the RTT, and the retransmission ratio of the WAN side and the use circumstances of the buffer. Since the control bandwidth of the WAN side is recovered so as to be large and an accumulation amount in the buffer is reduced, win_size increases. When win_size becomes larger than 0, an ACK packet (1522) in which win_size=3 increasing to 3 is described is immediately returned to the terminal 111. As such, if there is a margin in the buffer remaining capacity and a value of win_size is recovered, an ACK packet is immediately transmitted and a notification of a value of win_size is sent (1521).

Next, the fourth data accumulated in the reception buffer of the LAN side is transferred to the transmission buffer of the WAN side (1510).

Next, when a fifth data packet is transmitted from the terminal 111 of the LAN side, a single packet is accumulated in the reception buffer of the LAN side (1511). After the fifth data packet is received, the device 101 calculates win_size based on the control bandwidth, the RTT, and the retransmission ratio of the WAN side and the use circumstances of the buffer. Since a buffer use amount increases, win_size is reduced. The device 101 returns an ACK packet in which ACK=5 indicating that the fifth data has been received and reduced win_size=2 are described to the terminal 111. In addition, the fourth data is transmitted to the WAN side, and, simultaneously, the fifth data accumulated in the reception buffer of the LAN side is transferred to the transmission buffer of the WAN side (1512).

As such, when the line bandwidth of the WAN side is smaller than the line bandwidth of the LAN side, and the output throughput (1602) to the device 102 of the WAN side from the device 101 is smaller than the input throughput (1601) to the device 101 from the terminal 111 of the LAN side, the device 101 sends an ACK packet in which win_size=0 is described to the terminal 111 early if a remaining capacity of the reception buffer of the LAN side and the transmission buffer of the WAN side is reduced, so as to stop transmission by the transmission terminal 111. Thereby, it is possible to decrease the input throughput to the device 101 from the terminal 111 of the LAN side (1601) and to thereby reduce a data accumulation amount in the buffer when transmission of data stops (1603). Since a data accumulation amount is small, transmission of data to the device 102 of the WAN side progresses, and time until there is a margin in the buffer remaining capacity is shortened, thereby shortening time until transmission is resumed (1604). Further, when the buffer remaining capacity is recovered, a notification of win_size larger than 0 is immediately sent to the transmission terminal 111, and thereby it is possible to immediately resume transmission of data. Thereby, a stop time of transmission from the transmission terminal 111 of the LAN side to the device 101 is reduced, and thus forced cancellation of connection is unlikely to occur due to the transmission terminal 111 of the LAN side mistaking that a connection is disconnected (1604). In addition, since a fluctuation in a data accumulation amount in the reception buffer of the LAN side and the transmission buffer of the WAN side of the device 101 is reduced, and thus it is hard for bottom-out to occur, a transmission bandwidth of the WAN side is easily maintained to be constant (1602).

According to the aspects of the above-described present embodiment, in the relay device which relays between two TCP communication items of the LAN side and the WAN side, when a line bandwidth of the WAN side is smaller than a line bandwidth of the LAN side, and an output throughput to the WAN side from the relay device is relatively smaller than an input throughput to the relay device from a transmission terminal of the LAN side, the transmission terminal of the LAN side can be notified that a buffer remaining capacity is 0 early even if there is a vacancy in a reception buffer for LAN side TCP communication, thereby stopping transmission. Thereby, since the input throughput to the relay device from the transmission terminal of the LAN side is reduced, a large volume of data is prevented from being accumulated in the reception buffer for the LAN side TCP communication and the transmission buffer for the WAN side TCP communication in a short time and from overflowing. In addition, by reducing an accumulation amount in the buffer, a communication stop time until there is a margin in the buffer of the relay device again and communication is resumed, is shortened. Further, when there is a margin in the buffer, a notification thereof is immediately sent to the transmission terminal so as to immediately resume communication, and thereby a communication stop time is shortened. With these effects, a communication stop time between the transmission terminal of the LAN side and the relay device is shortened, and a connection is prevented from being forced to be canceled due to time-out caused by the transmission terminal of the LAN side mistaking communication for being disconnected.

INDUSTRIAL APPLICABILITY

The present invention is applicable to, for example, a communication device which relays communication between terminals.

The invention claimed is:

1. A communication device which relays TCP communication of a first network and a second network, comprising:
   a buffer that temporarily accumulates relay data which is received from the first network and is relayed to the second network;
   a reception unit that calculates a size of the relay data accumulated in the buffer; and
   a transmission bandwidth control unit that measures a practical transmission throughput to the second network,
   wherein the reception unit calculates a value of a reception window size which is described in an ACK packet transmitted in the TCP communication of the first network side on the basis of the size of the relay data and the transmission throughput.

2. The communication device according to claim 1, wherein, when a remaining capacity is equal to or less than a predetermined capacity even if the buffer has a vacancy, a value of the reception window size described in the ACK packet is set such that the remaining capacity is zero.

3. The communication device according to claim 1, wherein the reception unit
   divides the size of the relay data by the transmission throughput; and
   sets a value of the reception window size described in an ACK packet transmitted in the TCP communication of the first network side, to 0, when a value obtained by dividing the size of the relay data by the transmission throughput is equal to or more than a predefined threshold value.

4. The communication device according to claim 3, wherein, when an ACK packet in which a value of the reception window size is 0 is transmitted in the TCP communication of the first network side and then a packet including unreceived data is received, the reception unit increments a reception sequence number in the TCP communication of the first network side, and transmits an ACK packet in which the reception window size is set to 0.

5. The communication device according to claim 1, further comprising:
a first storage region that records a round trip time in the second network,
wherein the reception unit calculates a value of the reception window size which is described in an ACK packet transmitted in the TCP communication of the first network side on the basis of the size of the relay data, the transmission throughput, and the round trip time.

6. The communication device according to claim 5, wherein the reception unit
sets a value of the reception window size described in an ACK packet transmitted in the TCP communication of the first network side, to 0, when a value which is obtained by dividing a value obtained by subtracting a multiplication value of the transmission throughput and the round trip time from the size of the relay data by the transmission throughput is equal to or more than a predefined threshold value.

7. The communication device according to claim 5, further comprising:
a packet retransmission unit that retransmits a discarded packet when the discarded packet is detected in the TCP communication of the second network side,
wherein the transmission bandwidth control unit measures a retransmission throughput in the TCP communication of the second network side, and calculates a retransmission ratio by dividing the measured retransmission throughput by the transmission throughput, and
wherein the reception unit determines a value of the reception window size which is described in an ACK packet transmitted in the TCP communication of the first network side on the basis of the size of the relay data, the transmission throughput, the round trip time, and the retransmission ratio.

8. The communication device according to claim 7, wherein the reception unit
calculates a coefficient which becomes large in proportion to increases in the transmission throughput, the round trip time, and the retransmission ratio; and
sets a value of the reception window size described in an ACK packet transmitted in the TCP communication of the first network side, to 0, when a value which is obtained by dividing a value obtained by subtracting a multiplication value of the transmission throughput, the round trip time, and the coefficient from the size of the relay data by the transmission throughput is equal to or more than a predefined threshold value.

9. The communication device according to claim 7, further comprising:
a second storage region that holds an interval time;
a third storage region that records a reference time point to which the interval time is added when a difference between a current time point and the reference time point is larger than the interval time; and
a fourth storage region that records a retransmission throughput after the reference time point and a transmission throughput before the reference time point,
wherein the reception unit obtains a retransmission ratio by dividing the retransmission throughput after the reference time point by the transmission throughput before the reference time point.

10. The communication device according to claim 1, wherein the buffer includes
a first network side reception buffer that accumulates data received from the first network until being arranged, and accumulates the data until being read even after the data is arranged; and
a second network side transmission buffer that accumulates data transmitted to the second network, and accumulates the data until ACK is received from the second network side even after the data is transmitted, and
wherein the reception unit calculates a size of the accumulated relay data by adding sizes of the arranged data and unarranged data accumulated in the first network side reception buffer to sizes of untransmitted data and ACK awaiting data accumulated in the second network side transmission buffer.

11. The communication device according to claim 10, further comprising:
a data transfer unit that reads the arranged data of the first network side reception buffer so as to be written in the second side transmission buffer as untransmitted data,
wherein the reception unit calculates a size of the relay data by further adding a size of data on which a process by the data transfer unit is in progress.

12. The communication device according to claim 11, wherein the data transfer unit performs a processing on data during transfer of data.

13. The communication device according to claim 10, wherein, when an ACK packet in which a value of the reception window size is 0 is transmitted in the TCP communication of the first network side and then a packet including unreceived data is received, the reception unit accumulates the received packet in the first network side reception buffer if there is a vacancy in the first network side reception buffer, increments a reception sequence number in the TCP communication of the first network side, and transmits an ACK packet in which the reception window size is set to 0.

14. The communication device according to claim 1, wherein, when a value of the reception window size of which a notification is to be sent in the TCP communication of the first network side decreases to less than a predefined threshold value and then increases to the threshold value or more again, even if there is no received packet in the TCP communication of the first network side, the reception unit obtains a value of a new reception window size in the TCP communication of the first network side and transmits an ACK packet in which the value of the reception window size is described.

* * * * *